(12) United States Patent
Wilson

(10) Patent No.: US 12,474,791 B2
(45) Date of Patent: Nov. 18, 2025

(54) SIX-DEGREE OF FREEDOM POSE ESTIMATION OF A STYLUS

(71) Applicant: zSpace, Inc., San Jose, CA (US)

(72) Inventor: Mark Wilson, San Jose, CA (US)

(73) Assignee: zSpace, Inc., San Jose, CA (US)

( * ) Notice: Subject to any disclaimer, the term of this patent is extended or adjusted under 35 U.S.C. 154(b) by 0 days.

(21) Appl. No.: 18/233,152

(22) Filed: Aug. 11, 2023

(65) Prior Publication Data

US 2025/0053249 A1 Feb. 13, 2025

(51) Int. Cl.
*G06F 3/03* (2006.01)
*G06F 3/0346* (2013.01)
*G06F 3/0354* (2013.01)

(52) U.S. Cl.
CPC ........ *G06F 3/03545* (2013.01); *G06F 3/0346* (2013.01)

(58) Field of Classification Search
CPC ............................ G06F 3/03545; G06F 3/0346
See application file for complete search history.

(56) References Cited

U.S. PATENT DOCUMENTS

| 6,608,622 | B1 | 8/2003 | Katayama et al. | |
|---|---|---|---|---|
| 2006/0283962 | A1* | 12/2006 | Silverstein | G06F 3/03542 235/494 |
| 2012/0162204 | A1 | 6/2012 | Vesely et al. | |
| 2013/0181953 | A1* | 7/2013 | Hinckley | G06F 3/03545 345/179 |
| 2014/0043547 | A1* | 2/2014 | Marhefka | G06F 3/038 349/12 |
| 2016/0258782 | A1 | 9/2016 | Sadjadi et al. | |
| 2020/0069210 | A1 | 3/2020 | Berenzweig et al. | |

(Continued)

FOREIGN PATENT DOCUMENTS

| CN | 111182187 A | * | 5/2020 | ........... F16M 11/046 |
|---|---|---|---|---|
| CN | 114127669 A | * | 3/2022 | .............. G06F 3/011 |

(Continued)

OTHER PUBLICATIONS

International Search Report and Written Opinion; International Application No. PCT/US2024/041251; mailed Nov. 21, 2024; 22 pgs.

(Continued)

*Primary Examiner* — Towfiq Elahi
(74) *Attorney, Agent, or Firm* — Kowert, Hood, Munyon, Rankin & Goetzel, P.C.; Jeffrey C. Hood; Brian E. Moore

(57) ABSTRACT

Systems and methods for six-degree of freedom (6-DoF) pose estimation of a user input device, e.g., in a three-dimensional (3D) system rendering interactive augmented reality (AR) and/or virtual reality (VR) experiences include the user input device capturing, via a camera disposed at a forward-facing tip of the user input device, images in a direction the user input device is directed and providing the images to a computer system. The user input device provides inertial measurement unit (IMU) data to the computer system as well. The computer system may then determine pose information associated with the user input device based on the images and IMU data of the user input device. The determination of the pose information may be via usage of at least one of a neural network model, estimation model trained on a set of unique and identifiable patterns, and/or an estimation model trained on a dataset of images.

30 Claims, 11 Drawing Sheets

(56) References Cited

U.S. PATENT DOCUMENTS

| | | | |
|---|---|---|---|
| 2020/0142509 A1* | 5/2020 | Weidler | G06F 3/03542 |
| 2021/0026464 A1* | 1/2021 | Yamada | G06F 3/03545 |
| 2021/0350566 A1 | 11/2021 | Hu et al. | |
| 2021/0350573 A1 | 11/2021 | Kalra et al. | |
| 2022/0198747 A1 | 6/2022 | Savaroche | |
| 2022/0276729 A1 | 9/2022 | Gutierrez et al. | |
| 2023/0072423 A1 | 3/2023 | Osborn et al. | |
| 2023/0093979 A1 | 3/2023 | Stauber et al. | |

FOREIGN PATENT DOCUMENTS

| | | | | |
|---|---|---|---|---|
| CN | 217821669 U | * | 11/2022 | G06V 30/142 |
| WO | 00/25293 | | 5/2000 | |

OTHER PUBLICATIONS

International Search Report and Written Opinion; International Application No. PCT/US2024/041199; mailed Oct. 23, 2024; 11 pgs.

* cited by examiner

SIX-DEGREE OF FREEDOM POSE ESTIMATION OF A STYLUS

TECHNICAL FIELD

This disclosure relates to the field of digital display and more particularly to systems, mechanisms, and methods for six-degree of freedom (6-DoF) pose estimation of a stylus, e.g., in a three-dimensional (3D) display system rendering interactive augmented reality (AR) and/or virtual reality (VR) experiences.

DESCRIPTION OF THE RELATED ART

Three-dimensional (3D) displays (actually, simulated 3D, e.g., via stereoscopic display (SD) techniques) are increasingly utilized for a variety of applications, including, for example, remote viewing, videoconferencing, video collaboration, and so forth.

A typical 3D display chain includes a graphics processing unit (GPU), a scaler, and a panel. The GPU resides on a personal computer, workstation, or functional equivalent, e.g., such as various user equipment devices (UEs) and outputs video levels for each color or channel of a supported color model, e.g., for each of three colors, typically Red (R), Green (G), and Blue (B), for each pixel on the display. Each of these numbers is typically an 8-bit number, with a range of 0 to 255, although other ranges are possible. The scaler takes as input the video levels (e.g., for R, G, and B) for each pixel output from the GPU, and processes them in various ways, before outputting (usually) modified video levels for RGB, usually in the same 8-bit range of 0-255. This component may also scale an image from the input resolution to a different, rendered resolution supported by the display. The panel is the display itself, typically a liquid crystal display (LCD), although other displays are possible, and takes as input the video levels (e.g., for R, G and B) output from the scaler for each pixel, and converts the video levels to voltages, which are then delivered to each pixel on the display. The panel itself may modify the video levels before converting them to voltages.

The 3D display chain generally modifies the video levels in two ways, specifically gamma correction and overdrive. Note that the functionality described above is typically implemented in the scaler, but is sometimes implemented at least partially in other devices or elements of the 3D display chain, e.g., in the GPU or display device (panel).

SUMMARY

Embodiments relate to the field of digital display and more particularly to systems, mechanisms, and methods for six-degree of freedom (6-DoF) pose estimation of a stylus, e.g., in a three-dimensional (3D) display system rendering interactive augmented reality (AR) and/or virtual reality (VR) experiences. Embodiments described herein may include methods performed by a client device, e.g., a user equipment device (UE) to estimate a 6-DoF pose of a stylus that employ the usage of a neural network model for 6-DoF pose estimation of the stylus, a dataset-based model for 6-DoF pose estimation of the stylus, a Charuco codes-based model for 6-DoF pose estimation of the stylus, and/or some combination thereof. In various embodiments, the stylus may include one or more integrated cameras as well as an Inertial Measurement Unit (IMU).

For example, in some embodiments, a user input device may capture, e.g., via at least one camera of the user input device, images in a direction that the user input device is directed. The images may be a sequence of images and/or a video stream of images. The at least one camera may be disposed at a forward-facing tip of the user input device. In addition, the user input device may determine, via an inertial measurement unit (IMU), motion of the user input device in three-dimensional (3D) space. Further, the user input device may determine pose information associated with the user input device based, at least in part, on the images and motion of the user input device. The pose information may include a six-degree of freedom position and orientation of the user input device. The determination of the pose information may be via usage of at least one of a neural network model, estimation model trained on a set of unique and identifiable patterns, and/or an estimation model trained on a dataset of images.

At another example, in some embodiments, a computer system may receive, from a user input device, images in a direction that the user input device is directed. The images may be captured via at least one camera disposed at a forward-facing tip of the user input device. The images may be a sequence of images and/or a video stream of images. In addition, the computer system may determine, from data received from an IMU of the user input device, motion of the user input device in 3D space. Further, the computer system may determine pose information associated with the user input device based, at least in part, on the images and motion of the user input device. The pose information may include a six-degree of freedom position and orientation of the user input device. The determination of the pose information may be via usage of at least one of a neural network model, estimation model trained on a set of unique and identifiable patterns, and/or an estimation model trained on a dataset of images.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present disclosure can be obtained when the following detailed description of the preferred embodiment is considered in conjunction with the following drawings, in which.

Figure 1A:
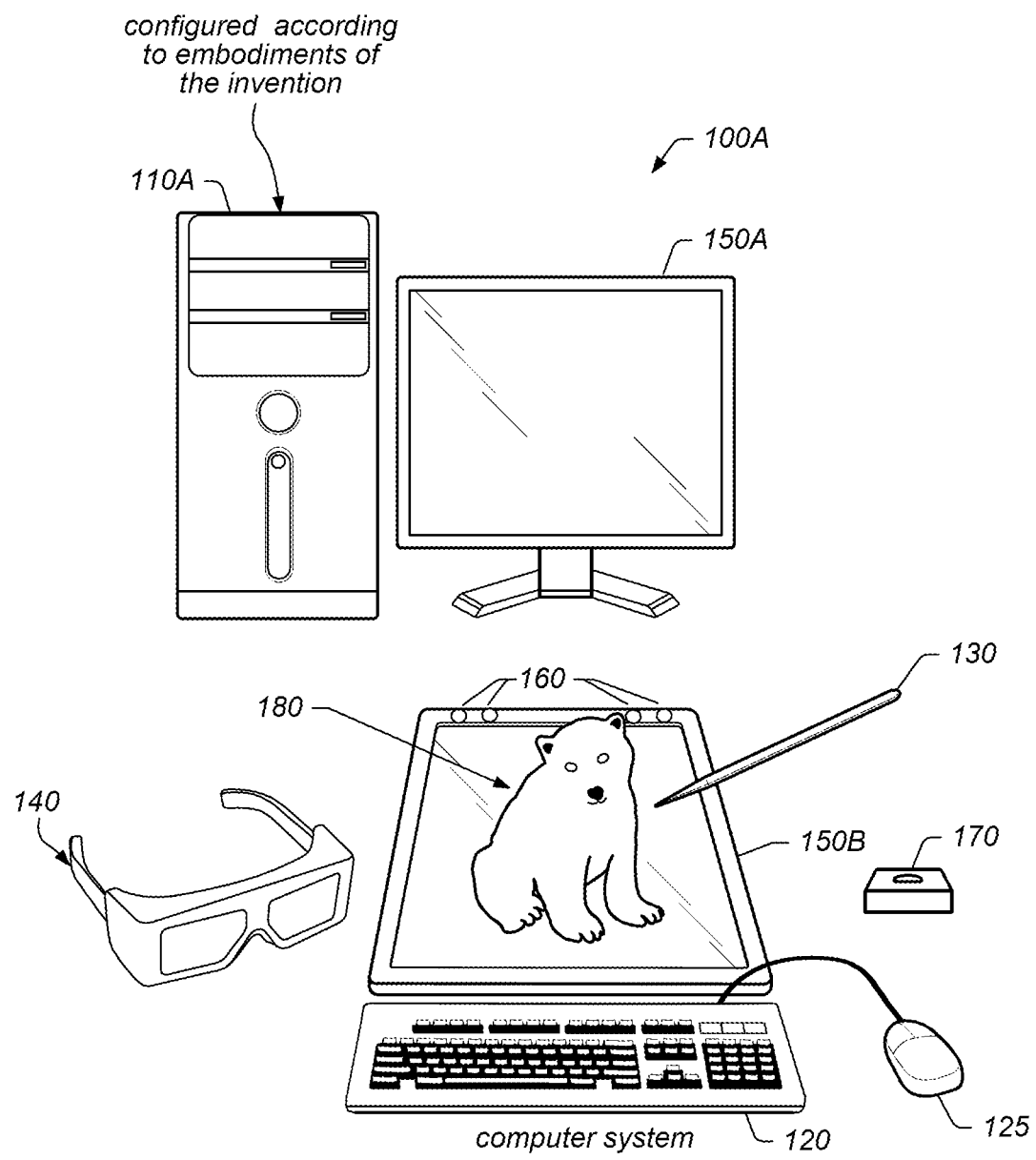
FIGS. 1A and 1B illustrate examples of 3D stereoscopic display systems configured according to some embodiments.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Terms

The following is a glossary of terms used in the present application:

Memory Medium—any of various types of memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, EEPROM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, tablet, or other device or combinations of devices. In general, the term "computer system" can be broadly defined to encompass any device (or combination of devices) having at least one processor that executes instructions from a memory medium.

Graphical Processing Unit—refers to a component that may reside on a personal computer, workstation, server, graphics server, or equivalent, and outputs video levels for each color or channel of a supported color model, e.g., for each of three colors, typically Red (R), Green (G), and Blue (B), for each pixel on the display. Each of these numbers is typically an 8-bit number, with a range of 0 to 255, although other ranges are possible.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element (or Functional Unit)—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Coupled Zone—refers to a physical volume in which the user of a 3D stereoscopic display can view 3D content within the human eye's natural depth of field. For example, when a person sees an object in the physical world, the person's eyes converge on, or look (individually aim) at, the object. Additionally, as the two eyes converge on the object, each eye's lens also focuses, via accommodation, (monoscopically) on the object. In this sense, both eyes focus and converge on the object, thus focus and convergence are "coupled."

Disparity—refers to the difference between the left eye and right eye images of a 3D stereoscopic display. Disparity may be described in at least two ways. First, with respect to the display device, i.e., the 3D stereoscopic display, disparity may be described by the number of pixels of separation between corresponding positions of the image, or content, being displayed, or rendered. In other words, the pixels of separation between the left eye and right eye images, or content. Alternatively, or in addition to, with respect to the point of view of the user, disparity may be described by the degree of angular separation between corresponding positions in the images, or content, being displayed, or rendered, i.e., the angular separation between the left eye and right eye images, or content.

Projection—refers to the display of a 3D object, or content, on a two-dimensional (2D) display. Thus, a projection may be described as the mathematical function applied to objects within a virtual 3D scene to determine the virtual position of the objects within a 3D space that may be defined by the size of the 3D stereoscopic display and the point of view of a user.

Viewpoint—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D scene. A viewpoint is synonymous with "point of view" (POV). (See definition of POV below.)

Eyepoint—the physical location (and/or orientation) of a single eye or a pair of eyes. A viewpoint above may correspond to the eyepoint of a person. For example, a person's eyepoint has a corresponding viewpoint.

Point of View (POV)—refers to or specifies a position and orientation. For example, a POV may be a viewpoint or eyepoint, generally of a user, but may also be a viewpoint of an optical device, such as a camera. The POV is generally a means to capture a relationship between two or more 6 degree of freedom objects. In a typical application of the present techniques, a user's pair of eyes or head (view) is positioned in any X, Y, Z position and/or pitch, yaw, roll orientation to a display device, e.g., a monitor screen, which may have its own position in any X, Y, Z position and/or pitch, yaw, roll orientation. In this example, the POV can be defined as the position/orientation of the user's view with respect to the positioning/orientation of the display device. The POV determination may be identified by a capture system. In a typical application of the present techniques, one or more tracking devices are attached to the display device, such that the controller knows what the tracking system tracks in the context of the display device, meaning the tracking system, being attached to the display device, is programmatically aware of the position/orientation of the display device, as well as any potential change to the position/orientation of the display device.

The tracking system (which may identify and track, among other things, the user's view) may identify the position/orientation of the user's view, and this information may then be correlated to the tracking system's identification of the viewing device's position/orientation (again, with respect to the display device).

Vertical Perspective—a perspective effect rendered from a viewpoint which is substantially perpendicular to the display surface. "Substantially perpendicular" refers to 90 degrees or variations thereof, such as 89 or 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal or Oblique Perspective-a perspective effect rendered from a viewpoint which is not perpendicular to the display surface. More particularly, the term "horizontal perspective" may typically refer to a perspective effect which is rendered using a substantially 45-degree angled render plane in reference to the corresponding viewpoint. The rendering may be intended for a display which may be positioned horizontally (e.g., parallel to a table surface or floor) in reference to a standing viewpoint. "Substantially 45 degrees" may refer to 45 degrees or variations thereof, such as 44 and 46 degrees, 40-50 degrees, or any variation which may cause minimal distortion of the rendered scene. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints.

Another conception of the horizontal perspective as commonly used in embodiments of the present techniques relates to the projection of the intended rendered graphics to the viewing device. With the POV determined, a horizontal perspective engine may identify the correct graphics frustum in the 3D space, taking into account the position and orientation of the viewing device as defining the render plane of the frustum and the user's view in position and orientation to define a camera point of the frustum in relation to the render plane. The resultant projection is then rendered onto the viewing device as will be seen by the user.

Position—the location or coordinates of an object (either virtual or real). For example, position may include x, y, and z (i.e., location) coordinates within a defined space. The position may be relative or absolute, as desired. Position may also include yaw, pitch, and roll information, e.g., when defining the orientation of a viewpoint. In other words, position is defined broadly so as to encompass information regarding both location and orientation.

Passive Stylus—a peripheral device or element such as a handheld device, handheld pen device, handheld pointing device, hand, finger, glove, or any object used to directly interact with rendered virtual objects as in a stereo rendered virtual projected objects.

Active Stylus—a peripheral device or element that provides additional capabilities to improve accuracy and precision in the determination of a position of the active stylus. These capabilities may include one or more of accelerometers, magnetometers, gyroscopes, global positioning system, compass, and/or gravity sensor. Examples include a handheld device, handheld pen device, handheld pointing device, and/or any object that includes such capabilities and is used to directly interact with rendered virtual objects as in a stereo rendered virtual projected objects.

Similar—as used herein in reference to geometrical shapes, refers to the geometrical term indicating that objects have the same shape, or that one object has the same shape as the mirror image of the other object. In other words, objects are considered similar if one object may be obtained from the other by uniformly scaling (enlarging or shrinking) the object. Additionally, the term similar, or similar objects, means that either object may be rescaled, repositioned, and reflected, so as to coincide with the other object. Thus, for example, if a first object is geometrically similar to a second object, i.e., has the same shape but possibly a different size, then either object may be uniformly scaled to obtain the geometrical size and shape of the other object. Thus, the first object may be uniformly scaled to obtain the second object or the second object may be uniformly scaled to obtain the first object. Note that this definition of similar only refers to the use of the word in the context of geometrical shapes and retains it ordinary meaning in other contexts (e.g., system A is similar to system B implies that system A resembles system B without being identical to system B).

Approximately—refers to a value that is correct or exact within some specified tolerance. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

Proximate—near to; for example, proximate may mean within some specified distance, or within some specified fraction of a distance. Note that the actual threshold for being proximate is generally application dependent. Thus, in various applications, proximate may mean being within 1 mm, 1 inch, 1 foot, 1 meter, 1 mile, etc. of some reference point or object, or may refer to being within 1%, 2%, 5%, 10%, etc., of a reference distance from some reference point or object.

Substantially—refers to a term of approximation. Similar to the term "approximately," substantially is meant to refer to some tolerable range. Thus, if part A is substantially horizontal, then part A may be horizontal (90 degrees from vertical), or may be within some tolerable limit of horizontal. For example, in one application, a range of 89-91 degrees from vertical may be tolerable, whereas, in another application, a range of 85-95 degrees from vertical may be tolerable. Further, it may be that the tolerable limit is one-sided. Thus, using the example of "part A is substantially horizontal," it may be tolerable for Part A to be in a range of 60-90 degrees from vertical, but not greater than 90 degrees from vertical. Alternatively, it may be tolerable for Part A to be in a range of 90-120 degrees from vertical but not less than 90 degrees from vertical. Thus, the tolerable limit, and therefore, the approximation referenced by use of the term substantially may be as desired or as required by the particular application.

Equivalent—refers to an object that is equal to or corresponds with another object in value, measure, function, meaning, effect, significance, appearance, and so forth. For example, a first image may be equivalent to a second image if imagery within the first image corresponds to imagery within the second image. Additionally, a first image may be substantially equivalent to a second image if imagery within the first image at least partially corresponds to imagery with the second image, e.g., within some tolerable range and/or limit.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Comprising—this term is open-ended, and means "including." As used in the appended claims, this term does not foreclose additional elements, structure, or steps. Consider a claim that recites: "A system comprising a display . . . "; such a claim does not foreclose the system from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

This specification may include references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Exemplary Systems

Figure 1B:
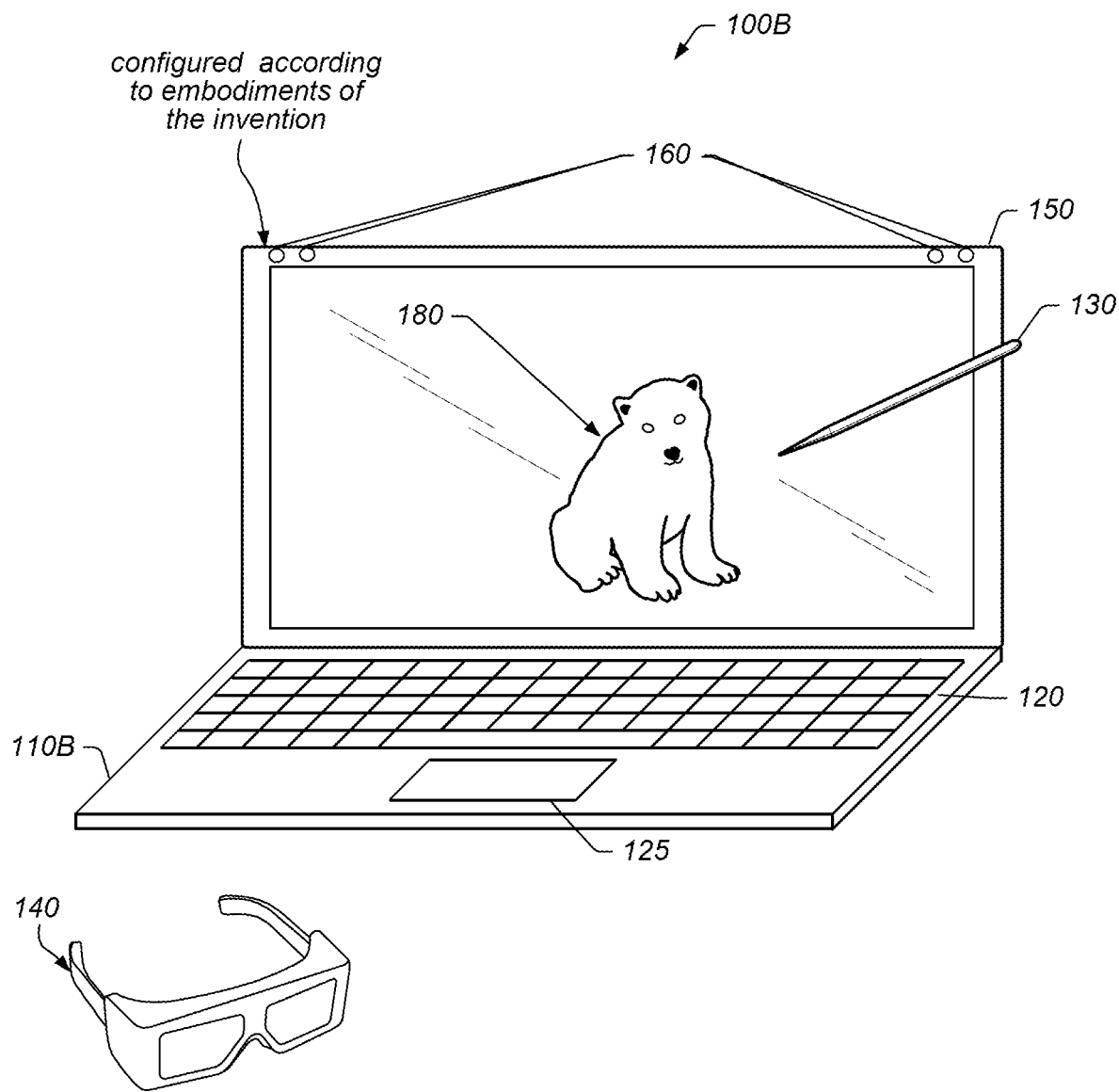

FIGS. 1A and 1B illustrate exemplary systems configured to implement various embodiments of the techniques described below.

In the exemplary embodiment of FIG. 1A, computer system 100A may include chassis 110A, display 150A and display 150B (which may collectively be referred to as display 150 or "one or more displays" 150), keyboard 120, mouse 125, user input device 130, and at least two cameras 160. Additionally, the computer system 100A may optionally include eyewear 140 and/or caddy 170. Note that in some embodiments, two displays 150A and 150B may not be used; instead, for example, a single display 150 may be used. In various embodiments, at least one of the displays 150A and 150B may be a stereoscopic display. For example, in one embodiment, both of the displays 150A and 150B may be stereoscopic displays. Or, in other embodiments, the single display 150 may be a stereoscopic display. It is noted that a stereoscopic display may also be configured to display two-dimensional (2D) objects and may be configured to operate in a 2D mode.

The chassis 110A may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments, the graphics engine may be implemented on or by a functional unit or processing element. As used herein, and as noted in the Terms section above, the term functional unit or processing element refers to any of various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium (which may include two or more memory mediums) may also store data (and/or program instructions) (e.g., implementing or specifying a computer model) representing a virtual space, which may be used for projecting a 3D scene, such as scene 180, of the virtual space via the display(s) 150. Further, the memory medium may store software which is executable to perform three-dimensional spatial tracking (e.g., user view tracking, user control tracking, etc.), content processing, or other features, as described herein. For example, the computer system may include a tracking system that may track one or more of a user's head, a user's hand, or the stylus. Additionally, the memory medium may store operating system software, as well as other software for operation of the computer system. Various embodiments further include receiving or storing instructions and/or data implemented in accordance with the foregoing description upon a carrier medium.

As indicated above, the computer system 100A may be configured to display a three-dimensional (3D) scene (e.g., via stereoscopic images), or 3D content, such as scene 180, using the display 150A and/or the display 150B. The computer system 100A may also be configured to display a "view" of the 3D scene using the display 150A, the display 150B, and/or another display, as described in more detail below. The "view" of the 3D scene, or content, may refer to a displayed portion of the 3D scene from a viewpoint within the 3D scene. A viewpoint within the 3D scene may be referred to as a "virtual viewpoint." The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

It should be noted that the embodiment of FIG. 1A is exemplary only, and other numbers of displays are also envisioned. For example, the computer system 100A may include only a single display or more than two displays, or the displays may be arranged in different manners than shown, e.g., as goggles or other wearable eyewear or headgear as further described below in reference to FIG. 5. In this particular embodiment, the display 150A is configured as a vertical display (which may be perpendicular or approximately perpendicular to a user's line of sight) and the display 150B is configured as a horizontal display (which may be parallel (or approximately parallel) or oblique to a user's line of sight). The vertical display 150A may be used (e.g., via instructions sent by a graphics engine executing in the chassis 110A) to provide images which are presented according to a vertical (or central) perspective and the display 150B may be used (e.g., via instructions sent by a graphics engine executing in the chassis 110A) to provide images that are presented according to a horizontal perspective. Descriptions of horizontal and vertical perspectives are provided herein (see, e.g., the above Terms section). Additionally, while the displays 150 are shown as flat panel displays, in other embodiments, they may be any type of device or system which is capable of displaying images, e.g., projection systems. For example, display(s) 150 may be or include a CRT (cathode ray tube) monitor, an LCD (liquid crystal display) monitor, or a front projection or a back projection screen or surface with a plurality of projectors, among others. Display(s) 150 may include a light emitting diode (LED) backlight or other type of backlight.

Either or both of the displays 150A and 150B may present (display) stereoscopic images for viewing by the user. By presenting stereoscopic images, the display(s) 150 may present a 3D scene for the user. This 3D scene may be considered or referred to as an illusion or simulated 3D because the actual provided images are 2D, but the scene is conveyed in 3D via the user's interpretation of the provided images via stereoscopic effects. In order to properly view the stereoscopic images (one for each eye for each image frame), the user may wear eyewear 140, at least in some instances. Eyewear 140 may be any of anaglyph glasses, polarized glasses, shutter glasses, lenticular glasses, etc., among others. In some embodiments, the display(s) 150 may be included (or incorporated) in the eyewear (or other wearable headgear). In embodiments using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens of the eyewear has the corresponding orthogonal polarization for receiving the corresponding image. With shutter glasses, each lens is synchronized with respect to left and right eye images provided by the display(s) 150, e.g., in alternating fashion. The display may provide both polarizations simultaneously or in an alternating manner (e.g., sequentially), as desired. Thus, the left eye may be allowed to only see left eye images during the left eye image display time and the right eye may be allowed to only see right eye images during the right eye image display time. With lenticular glasses, images form on cylindrical lens elements or a two-dimensional array of lens elements. The stereoscopic image may be provided via optical methods, where left and right eye images are provided only to the corresponding eyes using optical means such as prisms, mirror(s), lens(es), and the like. Large convex or concave lenses can also be used to receive two separately projected images to the user.

In some embodiments, eyewear 140 may be used as a position input device to track the user view (e.g., eyepoint or point of view (POV)) of a user viewing a 3D scene presented by the system 100A. For example, eyewear 140 may provide information (e.g., position information, which includes orientation information, etc.) that is usable to determine the position of the point of view of the user, e.g., via triangulation. In some embodiments, the position input device may use a light sensitive detection system, e.g., may include an infrared detection system, to detect the position of the viewer's head to allow the viewer freedom of head movement. Other embodiments of the input device(s) may use the triangulation method of detecting the viewer point of view location, such as one or more sensors (e.g., two cameras, such as charge coupled-device (CCD) or complementary metal oxide semiconductor (CMOS) cameras) providing position data suitable for the head tracking. The input device(s), such as a stylus, keyboard, mouse, trackball, joystick, or the like, or combinations thereof, may be manually operated by the viewer to specify or indicate the correct display of the horizontal perspective display images. However, any method for tracking the position of the user's head or point of view may be used as desired. Accordingly, the 3D scene may be rendered from the perspective (or point of view) of the user such that the user may view the 3D scene with minimal distortions (e.g., since it is based on the point of view of the user). Thus, the 3D scene may be particularly rendered for the point of view of the user, using the position input device.

The relationships among the position of the display(s) 150 and the point of view of the user may be used to map a portion of the virtual space to the physical space of the system 100A. In essence, the physical space and components used may be mapped to the virtual model in order to accurately render a 3D scene of the virtual space.

One or more of the user input devices (e.g., the keyboard 120, the mouse 125, the user input device 130, pointing device, user control device, user hand/fingers, etc.) may be used to interact with the presented 3D scene. For example, the user input device 130 (shown as a stylus) or simply the user's hands may be used to directly interact with virtual objects of the 3D scene (via the viewed projected objects). Such direct interaction may be possible with negative space portions of the 3D scene. In some embodiments, at least a portion of the 3D scene may be presented in this negative space, which is in front of or otherwise outside of the at least one display, via stereoscopic rendering (of the 3D scene). In some embodiments, at least a portion of the 3D scene may appear as a hologram-like image above the surface of the display 150. For example, when the horizontal display 150B is used, the 3D scene may be seen as hovering above the horizontal display. It should be noted, however, that a portion of the 3D scene may also be presented as appearing behind the display surface, which is in positive space Thus, negative space refers to a space which the user is able to freely move in and interact with (e.g., where the user is able to place his hands (or more generally, user input device 130) in the space), as opposed to a space the user cannot freely move in and interact with (e.g., where the user is not able to place his hands (or a user input device 130) in the space, such as below the display surface). Thus, negative space may be considered to be a "hands-on volume" as opposed to an "inner-volume" (i.e., positive space), which may be under the surface of the display(s), and thus not accessible. Thus, the user may interact with virtual objects in the negative space because they are proximate to the user's own physical space. Said another way, the positive space is located behind (or under) the viewing surface, and so presented objects appear to be located inside (or on the back side of) the physical viewing device. Thus, objects of the 3D scene presented within the positive space do not share the same physical space with the user and the objects therefore cannot be directly and physically manipulated by hands or physically intersected by hand-held tools such as user input device 130. Rather, they may be manipulated indirectly, e.g., via a computer mouse, a joystick, virtual representations of hands, handheld tools, or a stylus, or by projections from the stylus (e.g., a virtual laser or a virtual plane).

In some embodiments, system 100A may include one or more sensors 160. The one or more sensors 160 may be included in a tracking system. FIG. 1A illustrates an embodiment using four cameras 160. For instance, two of the four cameras 160 may be used to sense a user view (e.g., point of view) and the other two cameras 160 may be used to sense a user input device (e.g., pointing device, stylus, hand, glove, etc.). Alternatively, fewer than four sensors may be used (e.g., two sensors), wherein each sensor may track both the user (e.g., the user's head and/or the user's point of view) and the user input device. Sensors 160 may be used to image a user of system 100A, track a user's movement, or track a user's head or eyes, among other contemplated functions. In one embodiment, cameras 160 may track a position and/or an orientation of user input device 130. The information regarding the position (including the orientation) of the user input device 130 provided by the one or more sensors 160 may be used to perform 3D tracking of the user input device 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination. System 100A may also include a caddy 170 to store user input device 130. Caddy 170 may also be used to calibrate the orientation of the stylus to a known roll, pitch, and yaw, and so may be in a fixed position relative to cameras 160.

In one embodiment, the system 100A may be configured to couple to a network, such as a wide area network, via an input. The input may be configured to receive data (e.g., image data, video data, audio data, etc.) over the network from a system similar to system 100A. In other embodiments, a tracking system may include cameras 160. Cameras 160 may be configured to provide visual information regarding a user (e.g., such that a POV, e.g., the position (including the orientation), of the user may be determined or such that a position of the user's hand may be determined). However, it should be noted that any type of various tracking techniques or devices may be used as desired. Note that as used herein, POV of a user refers to the perspective or POV from which a user optically views an object or image, i.e., a user's visual POV, and thus is defined with respect to the display device of the system. In some embodiments, the POV may be a 6 degree of freedom (6DOF) POV, e.g., three location coordinates and three orientation coordinates, although any POV may be used as desired, e.g., three location coordinates and two or three orientation coordinates, and so forth. As noted above, position coordinates may include both location and orientation coordinates.

Note that in some embodiments, the tracking system may rely at least in part on the components of chassis 110A to determine a position or a POV, e.g., via execution of one more programs by or on a processor or functional unit of chassis 110A, although in other embodiments the tracking system may operate independently, e.g., may have its own processor or functional unit.

In certain embodiments, the system may include components implementing a perspective-based image capture system, for capturing images of a target object at a location remote from the system. For example, the perspective-based image capture system may include an input configured to couple to a network for receiving information regarding a point of view (POV) from a tracking system at a remote location. The information regarding the POV may indicate a position of a remote user. The perspective-based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display(s) 150. A view of the 3D scene may be presented based on the virtual viewpoint, either by one or more of the display(s) 150 or another display, as desired. This view of the 3D scene may be stereoscopic or monoscopic, as desired.

A 3D scene generator (e.g., content processing system) stored and executed in the chassis 110A may be configured to dynamically change the displayed images provided by the display(s) 150. More particularly, the 3D scene generator may update the displayed 3D scene based on changes in the user view, user control (e.g., manipulations via the user input devices), etc. Such changes may be performed dynamically at run-time, and may be performed in real time. The 3D scene generator may also keep track of peripheral devices (e.g., user input device 130 or eyewear 140) to ensure synchronization between the peripheral device and the displayed image. The system may further include a calibration unit, procedure, and/or fiducial markers to ensure proper mapping of the peripheral device to the display images and proper mapping between the projected images and the virtual images stored in the memory of the chassis 110A.

Thus, the system 100A may present a 3D scene with which the user may interact in real time. The system may include real-time electronic display(s) 150 that may present or convey perspective images in the open space, and user input device 130 that may allow the user to interact with the 3D scene with hand controlled or hand-held tools. The system 100A may also include means to manipulate the displayed image in various ways, such as magnification, zoom, rotation, or movement, or even to display a new image. However, as noted above, in some embodiments, the system may facilitate such manipulations via the user's hands, e.g., without hand-held tools.

Further, while the system 100A is shown as including horizontal display 150B because it simulates the user's visual experience with the horizontal ground, other viewing surfaces may offer similar 3D illusion experiences. For example, the 3D scene may appear to be hanging from a ceiling by projecting the horizontal perspective images onto a ceiling surface, or may appear to be floating from a wall by projecting horizontal perspective images onto a vertical wall surface. More generally, any other variations in display orientation and perspective (or any other configuration of the system 100A) may be used as desired.

According to various embodiments of the present disclosure, the display 150 may display various types of information (for example, multimedia data or text data) to be provided to the user. The display 150 may be configured to include a liquid crystal display (LCD), a light emitting diode (LED) display, an organic LED (OLED) display, a plasma cell display, an electronic ink array display, an electronic paper display, a flexible LCD, a flexible electrochromic display, or a flexible electro wetting display. The display 150 may be connected functionally to an element(s) of the electronic device. Also, the display 150 may be connected functionally to an electronic device(s) other than the electronic device.

In the exemplary embodiment of FIG. 1B, computer system 100B may include chassis 110B which may include display 150, keyboard 120, trackpad or touchpad 135, and at least two cameras 160. The computer system 100B may also include user input device 130. Further, the computer system 100B may optionally include eyewear 140. Note that in some embodiments, computer system 100B may be a wireless or mobile station, e.g., such as a wireless station 106 further described below. For example, computer system 100B may be or included on mobile telephones or smart phones (e.g., iPhone™, Android™-based phones), tablet computers (e.g., iPad™, Samsung Galaxy™, etc.), laptop computers (e.g., MacBook™), portable gaming devices (e.g., Nintendo DS™, PlayStation Portable™, Gameboy Advance™, iPhone™), portable Internet devices, and/or other handheld devices. In various embodiments, at least one of the display 150 may be a stereoscopic display. It is noted that a stereoscopic display may also be configured to display two-dimensional (2D) objects and may be configured to operate in a 2D mode.

The chassis 110B may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments, the graphics engine may be implemented on or by a functional unit or processing element. As used herein, and as noted in the Terms section above, the term functional unit or processing element refers to any of various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium (which may include two or more memory mediums) may also store data (and/or program instructions) (e.g., implementing or specifying a computer model) representing a virtual space, which may be used for projecting a 3D scene, such as scene 180, of the virtual space via the display(s) 150. Further, the memory medium may store software which is executable to perform three-dimensional spatial tracking (e.g., user view tracking, user control tracking, etc.), content processing, or other features, as described herein. For example, the computer system may include a tracking system that may track one or more of a user's head, a user's hand, or the stylus. Additionally, the memory medium may store operating system software, as well as other software for operation of the computer system. Various embodiments further include receiving or storing instructions and/or data implemented in accordance with the foregoing description upon a carrier medium.

As indicated above, the computer system 100B (or more specifically, chassis 110B) may be configured to display a three-dimensional (3D) scene (e.g., via stereoscopic images), or 3D content, such as scene 180, using the display 150. The computer system 100B may also be configured to display a "view" of the 3D scene using the display 150. The "view" of the 3D scene, or content, may refer to a displayed portion of the 3D scene from a viewpoint within the 3D scene. A viewpoint within the 3D scene may be referred to as a "virtual viewpoint." The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

In some embodiments, the display 150 may present a 3D scene for the user. This 3D scene may be considered or referred to as an illusion or simulated 3D because the actual provided images are 2D, but the scene is conveyed in 3D via the user's interpretation of the provided images via stereoscopic effects. In some instances, in order to properly view the stereoscopic images (one for each eye for each image frame), the user may wear eyewear 140. Eyewear 140 may be any of anaglyph glasses, polarized glasses, shutter glasses, lenticular glasses, etc., among others. In other instances, the stereoscopic images may be properly viewed without the aid of eyewear 140.

In some embodiments, eyewear 140 may be used as a position input device to track the user view (e.g., eyepoint or point of view (POV)) of a user viewing a 3D scene presented by the system 100B. For example, eyewear 140 may provide information (e.g., position information, which includes orientation information, etc.) that is usable to determine the position of the point of view of the user, e.g., via triangulation. In some embodiments, the position input device may use a light sensitive detection system, e.g., may include an infrared detection system, to detect the position of the viewer's head to allow the viewer freedom of head movement. Other embodiments of the input device(s) may use the triangulation method of detecting the viewer point of view location, such as one or more sensors (e.g., two cameras, such as charge coupled-device (CCD) or complementary metal oxide semiconductor (CMOS) cameras) providing position data suitable for the head tracking. The input device(s), such as a stylus, keyboard, mouse, trackball, joystick, or the like, or combinations thereof, may be manually operated by the viewer to specify or indicate the correct display of the horizontal perspective display images. However, any method for tracking the position of the user's head or point of view may be used as desired. Accordingly, the 3D scene may be rendered from the perspective (or point of view) of the user such that the user may view the 3D scene with minimal distortions (e.g., since it is based on the point of view of the user). Thus, the 3D scene may be particularly rendered for the point of view of the user, using the position input device.

The relationships among the position of the display 150 and the point of view of the user may be used to map a portion of the virtual space to the physical space of the system 100B. In essence, the physical space and components used may be mapped to the virtual model in order to accurately render a 3D scene of the virtual space.

One or more of the user input devices (e.g., the keyboard 120, the trackpad 135, the user input device 130, pointing device, user control device, user hand/fingers, etc.) may be used to interact with the presented 3D scene. For example, the user input device 130 (shown as a passive stylus) or simply the user's hands may be used to directly interact with virtual objects of the 3D scene (via the viewed projected objects). Such direct interaction may be possible with negative space portions of the 3D scene. In some embodiments, at least a portion of the 3D scene may be presented in this negative space, which is in front of or otherwise outside of the at least one display, via stereoscopic rendering (of the 3D scene). In some embodiments, at least a portion of the 3D scene may appear as a hologram-like image above the surface of the display 150. It should be noted, however, that a portion of the 3D scene may also be presented as appearing behind the display surface, which is in positive space. Thus, negative space refers to a space which the user is able to freely move in and interact with (e.g., where the user is able to place his hands (or more generally, user input device 130) in the space), as opposed to a space the user cannot freely move in and interact with (e.g., where the user is not able to place his hands (or a user input device 130) in the space, such as below the display surface). Thus, negative space may be considered to be a "hands-on volume" as opposed to an "inner-volume" (i.e., positive space), which may be under the surface of the display(s), and thus not accessible. Thus, the user may interact with virtual objects in the negative space because they are proximate to the user's own physical space. Said another way, the positive space is located behind (or under) the viewing surface, and so presented objects appear to be located inside (or on the back side of) the physical viewing device. Thus, objects of the 3D scene presented within the positive space do not share the same physical space with the user and the objects therefore cannot be directly and physically manipulated by hands or physically intersected by hand-held tools such as user input device 130. Rather, they may be manipulated indirectly, e.g., via a computer mouse, a joystick, virtual representations of hands, handheld tools, or a stylus, or by projections from the stylus (e.g., a virtual laser or a virtual plane).

In some embodiments, system 100 may include one or more sensors 160. The one or more sensors 160 may be included in a tracking system. FIG. 1B illustrates an embodiment using four cameras 160. For instance, two of the four cameras 160 may be used to sense a user view (e.g., point of view) and the other two cameras 160 may be used to sense a user input device (e.g., pointing device, stylus, hand, glove, etc.). Alternatively, fewer than four sensors may be used (e.g., two sensors), wherein each sensor may track both the user (e.g., the user's head and/or the user's point of view) and the user input device. Sensors 160 may be used to image a user of system 100B, track a user's movement, or track a user's head or eyes, among other contemplated functions. In one embodiment, cameras 160 may track a position and/or an orientation of user input device 130. The information regarding the position (including the orientation) of the user input device 130 provided by the one or more sensors 160 may be used to perform 3D tracking of the user input device 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination.

In some embodiments, the system 100B may be configured to couple to a network, such as a wide area network, via an input or interface (wired or wireless). The input may be configured to receive data (e.g., image data, video data, audio data, etc.) over the network from a system similar to systems 100A or 100B. In other embodiments, a tracking system may include cameras 160. Cameras 160 may be configured to provide visual information regarding a user (e.g., such that a POV, e.g., the position (including the orientation), of the user may be determined or such that a position of the user's hand may be determined). However, it should be noted that any type of various tracking techniques or devices may be used as desired. Note that as used herein, POV of a user refers to the perspective or POV from which a user optically views an object or image, i.e., a user's visual POV, and thus is defined with respect to the display device of the system. In some embodiments, the POV may be a 6 degree of freedom (6DOF) POV, e.g., three location coordinates and three orientation coordinates, although any POV may be used as desired, e.g., three location coordinates and two or three orientation coordinates, and so forth. As noted above, position coordinates may include both location and orientation coordinates.

Note that in some embodiments, the tracking system may rely at least in part on the components of chassis 110B to determine a position or a POV, e.g., via execution of one more programs by or on a processor or functional unit of chassis 110B, although in other embodiments the tracking system may operate independently, e.g., may have its own processor or functional unit.

In certain embodiments, the system may include components implementing a perspective-based image capture system, for capturing images of a target object at a location remote from the system. For example, the perspective-based image capture system may include an input configured to couple to a network for receiving information regarding a point of view (POV) from a tracking system at a remote location. The information regarding the POV may indicate a position of a remote user. The perspective-based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display 150. A view of the 3D scene may be presented based on the virtual viewpoint, either by one or more of the display 150 or another display, as desired. This view of the 3D scene may be stereoscopic or monoscopic, as desired.

A 3D scene generator (e.g., content processing system) stored and executed in the chassis 110B may be configured to dynamically change the displayed images provided by the display 150. More particularly, the 3D scene generator may update the displayed 3D scene based on changes in the user view, user control (e.g., manipulations via the user input devices), etc. Such changes may be performed dynamically at run-time, and may be performed in real time. The 3D scene generator may also keep track of peripheral devices (e.g., user input device 130 or eyewear 140) to ensure synchronization between the peripheral device and the displayed image. The system may further include a calibration unit, procedure, and/or fiducial markers to ensure proper mapping of the peripheral device to the display images and proper mapping between the projected images and the virtual images stored in the memory of the chassis 110B.

Thus, the system 100B may present a 3D scene with which the user may interact in real time. The system may include real-time electronic display 150 that may present or convey perspective images in the open space, and user input device 130 that may allow the user to interact with the 3D scene with hand controlled or hand-held tools. The system 100B may also include means to manipulate the displayed image in various ways, such as magnification, zoom, rotation, or movement, or even to display a new image. However, as noted above, in some embodiments, the system may facilitate such manipulations via the user's hands, e.g., without hand-held tools.

According to various embodiments of the present disclosure, the display 150 may display various types of information (for example, multimedia data or text data) to be provided to the user. The display 150 may be configured to include a liquid crystal display (LCD), a light emitting diode (LED) display, an organic LED (OLED) display, a plasma cell display, an electronic ink array display, an electronic paper display, a flexible LCD, a flexible electrochromic display, or a flexible electro wetting display. The display 150 may be connected functionally to an element(s) of the electronic device. Also, the display 150 may be connected functionally to an electronic device(s) other than the electronic device. According to various embodiments of the present disclosure, the input module 240 may receive an input for controlling an attribute of, for example, a history screen. The input module 240 may receive, for example, an input of 'reference screen setting'. 'Reference screen setting' may involve an operation for storing information related to the screen in the storage module 210 in order to display the reference screen. The input module 240 may receive, for example, an input for displaying the reference screen. Attributes of the screen may include, for example, at least one of the position of the reference screen, a sound volume for the reference screen, brightness of the screen, and the size of the screen. If the input module 240 is included in a second electronic device, the input module 240 may not be provided in the electronic device according to various embodiments of the present disclosure.

Figure 2:
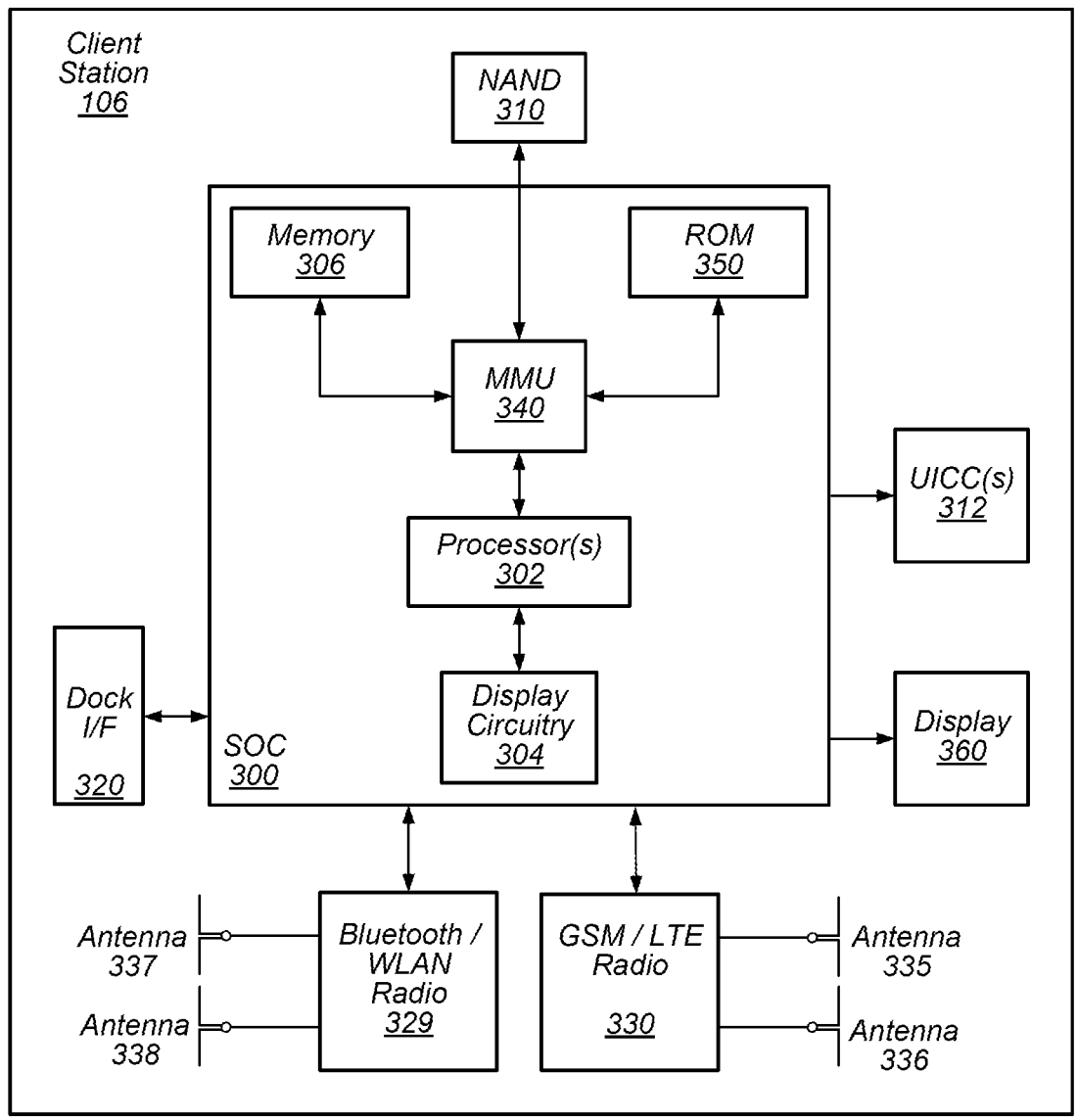
FIG. 2 illustrates an example block diagram of a user equipment device configured according to some embodiments.

FIG. 2 illustrates an example simplified block diagram of a wireless station 106. According to embodiments, wireless station 106 may be a user equipment (UE) device, a mobile device and/or mobile station. Wireless station 106 may be used in conjunction with the systems described herein, such as systems 100A, 100B, 500A, and/or 500B as described herein. For example, wireless station 106 may be configured as an input device to any of the described systems (e.g., wireless station 106 may be configured as a user input device). As another example, according to some embodiments, wireless station 106 may be configured as a display of any of the described systems. Thus, wireless station 106 may be configured to display a stereoscopic image. In some embodiments, wireless station 106 may be configured to communicate with a 3D system either wirelessly (e.g., via a local area network such as a Wi-Fi, Bluetooth, or Bluetooth low energy connection) or via a wired interface such as a universal serial bus interface, among other wired interfaces. In some embodiments, wireless station 106 may be included in a computer system, such as computer system 100B described above.

As shown, the wireless station 106 may include a system on chip (SOC) 300, which may include portions for various purposes. The SOC 300 may be coupled to various other circuits of the wireless station 106. For example, the wireless station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The wireless station 106 may further include one or more smart cards 312 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the wireless station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As described herein, the wireless station 106 may include hardware and software components for implementing the features described herein, e.g., the wireless station 106 may form at least part of a 3D display system such as systems 100A, 100B, 500A, and/or 500B as described herein. For example, the processor 302 of the wireless station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 312, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Figure 3A:
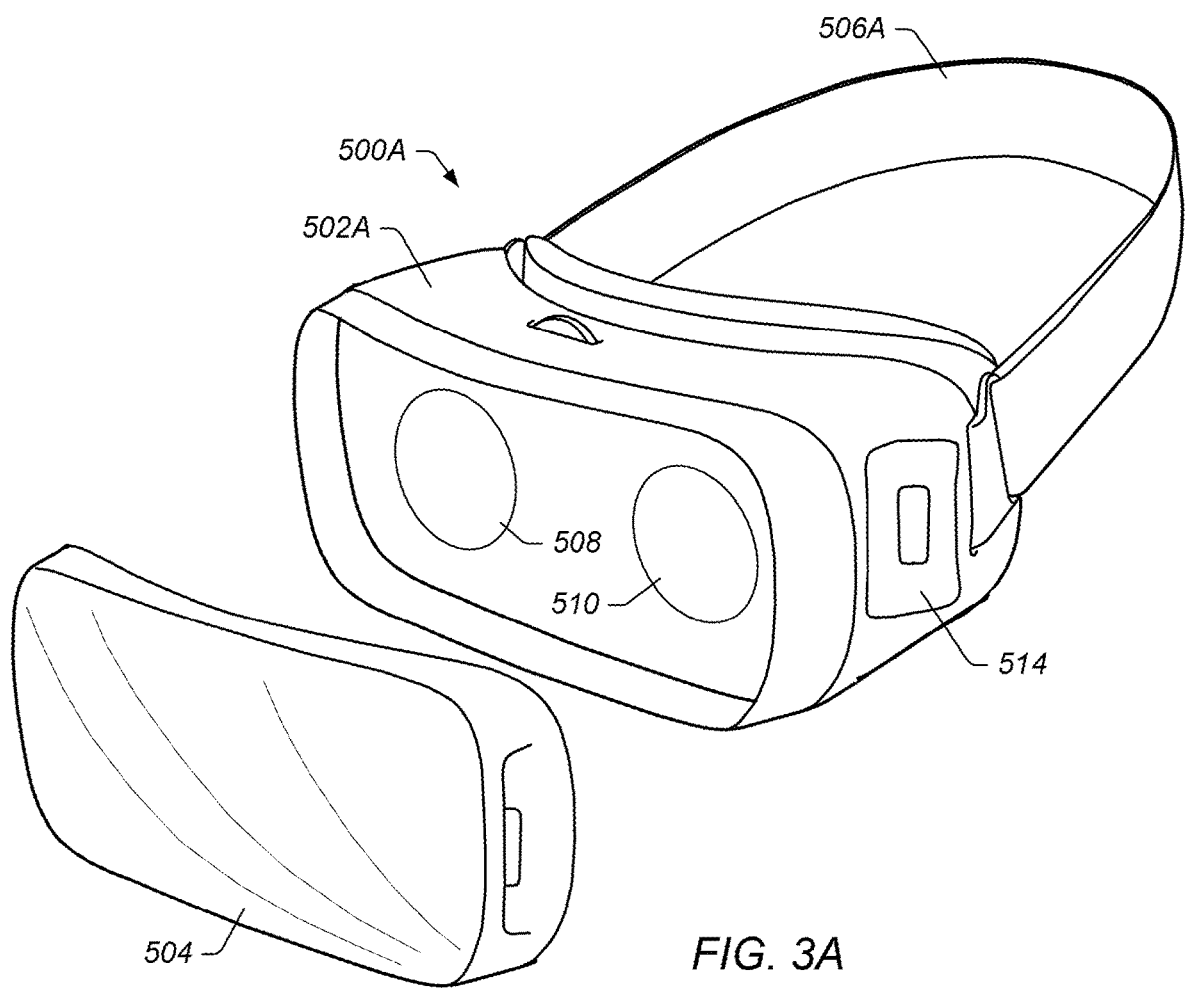
FIGS. 3A and 3B illustrate examples of a 3D head-mounted stereoscopic display system configured according to some embodiments.

Referring to FIG. 3A, a head-mounted electronic device 500A may include a body 502A and a cover 504. The body 502 may include lenses 508 and 510, and a control device 514. In addition, electronic device 500A may include a support 506A which may be configured to support electronic device 500A on a user's head. Lenses 508 and 510 may be positioned to correspond to eyes of a user. The user may view a screen on a display through lenses 508 and 510. The display may be coupled or connected to electronic device 500. In some embodiments, the display may be included on (or in) cover 504 and cover 504 may be configured to couple to body 502A. In some embodiments, electronic device 500B may include a display, such as display 150A or 150B described above in reference to FIGS. 1A and/or 1B. Thus, cover 504 may be communicatively coupled to body 502A (e.g., to couple a display of cover 504 to a processor of electronic device 500) and mechanically coupled (e.g., attached to) body 502. In some embodiments, the communicative coupling between body 502A and cover 504 may be wired and/or wireless.

In some embodiments, control device 514 may be located on a side surface of body 502A. Control device 514 may be used for the user to enter an input for controlling the head-mounted electronic device 500A. For example, control device 514 may include a touch panel, a button, a wheel key, and/or a touch pad. The touch panel may receive the user's touch input. The touch input may be a direct touch input to the touch panel or a hovering input in the vicinity of the touch panel.

Figure 3B:
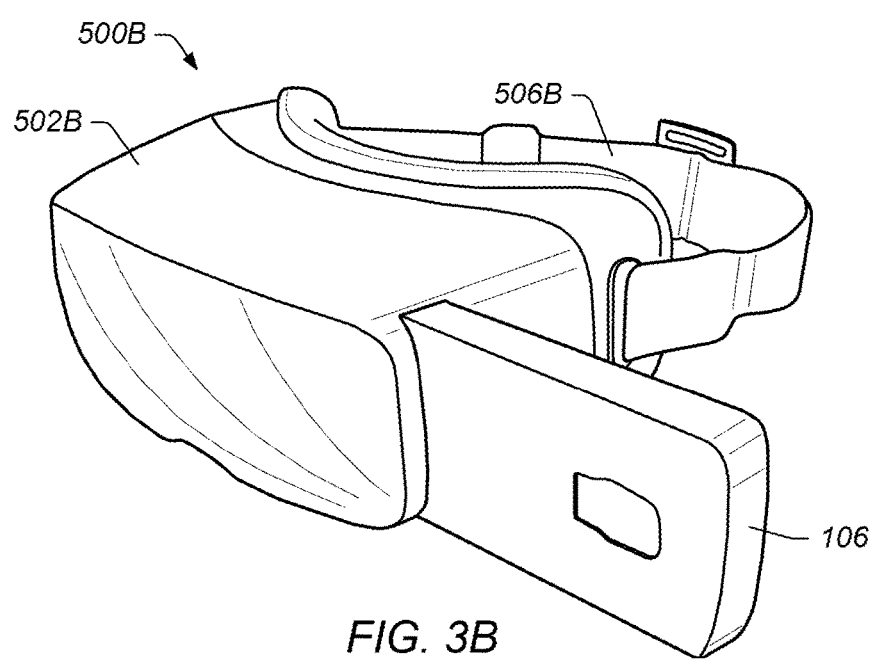

Turning to FIG. 3B, a head-mounted electronic device 500B may include a body 502B and a support 506B. Body 502B may be configured to couple to a wireless station and a display of electronic device 500B may be a display of a wireless station, such as wireless station 106, and the wireless station may be coupled or connected to (e.g., may be detachably mounted to) electronic device 500B. In other words, electronic device 500B may be configured such that a wireless station may be non-permanently coupled to, and removable without destructive measures, to electronic device 500B. Thus, electronic device 500B may be coupled to and decoupled from (e.g., non-destructively decoupled from) a wireless station without a change in functionality of the wireless station or electronic device 500B.

Figure 3C:
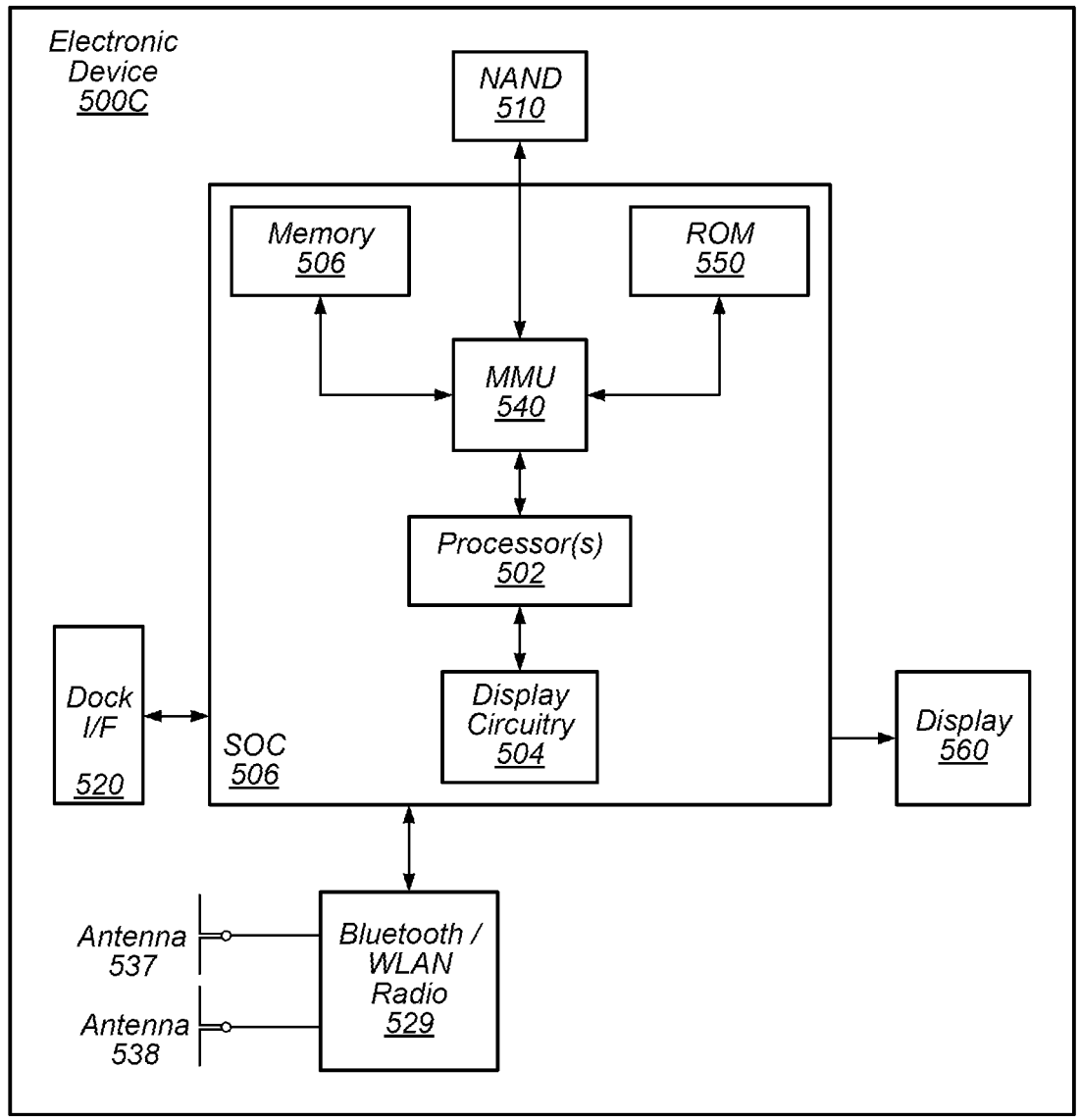
FIG. 3C illustrates an example block diagram of a head-mounted electronic device configured according to some embodiments.

Turning to FIG. 3C, FIG. 3C illustrates an example simplified block diagram of a head-mounted electronic device 500C. According to embodiments, electronic device 500C may be include a display (e.g., such as electronic device 500A) or may be configured to couple to wireless station (e.g., such as electronic device 500B). Note that electronic devices 500A and 500B described above may include at least portions of the features described in reference to electronic device 500C.

As shown, the electronic device 500C may include a system on chip (SOC) 506, which may include portions for various purposes. The SOC 506 may be coupled to various other circuits of the electronic device 500C. For example, the electronic device 500C may include various types of memory (e.g., including NAND flash 510), a connector interface (I/F) (or dock) 520 (e.g., for coupling to a computer system, dock, charging station, external display, etc.), the display 560 (note that is some embodiments, electronic device 500C may not include display 560), and short to medium range wireless communication circuitry 529 (e.g., Bluetooth™ and WLAN circuitry). The short to medium range wireless communication circuitry 529 may also couple to one or more antennas, such as antennas 537 and 538 as shown. The short to medium range wireless communication circuitry 529 may include multiple receive chains and/or multiple transmit chains for receiving and/or transmitting multiple spatial streams, such as in a multiple-input multiple output (MIMO) configuration.

As shown, the SOC 506 may include processor(s) 502, which may execute program instructions for the electronic device 500C and display circuitry 504, which may perform graphics processing and provide display signals to the display 560 (and/or to dock 520). The processor(s) 502 may also be coupled to memory management unit (MMU) 540, which may be configured to receive addresses from the processor(s) 502 and translate those addresses to locations in memory (e.g., memory 506, read only memory (ROM) 550, NAND flash memory 510) and/or to other circuits or devices, such as the display circuitry 504, short range wireless communication circuitry 529, connector interface (I/F) 520, and/or display 560. The MMU 540 may be configured to perform memory protection and page table translation or set up. In some embodiments, the MMU 540 may be included as a portion of the processor(s) 502.

In some embodiments, electronic device 500C (and/or an electronic device such as electronic device 500A or 500B) may be in communication with a user input device, such as user input device 130 described above. In some embodiments, the electronic device may receive user input via user input device 130 as described above.

In addition, in some embodiments, electronic device 500C may include one or more positional sensors such as accelerometers, gyroscopic sensors, geomagnetic sensors, magnetic sensors, proximity sensors, gesture sensors, grip sensors, and/or biometric sensors. In some embodiments, the electronic device may acquire information for determining a motion of a user wearing the electronic device and/or whether a user wears or removes electronic device 500C, using the one or more positional sensors. The at least one processor may control execution of a function(s) or an operation(s) corresponding to an input received through a control device (for example, control device 514 and/or user input device 130) in response to a received input.

As described herein, the electronic device 500C may include hardware and software components for implementing the features described herein, e.g., the electronic device 500C may form at least part of a 3D display system such as systems 100A, 100B, 500A, and/or 500B as described herein. For example, the processor 502 of the electronic device 500C may be configured to implement part or all of the features described herein, e.g., by executing program instructions stored on a memory medium (e.g., a non-transitory computer-readable memory medium). Alternatively (or in addition), processor 502 may be configured as a programmable hardware element, such as an FPGA (Field Programmable Gate Array), or as an ASIC (Application Specific Integrated Circuit). Alternatively (or in addition) the processor 502 of the UE 106, in conjunction with one or more of the other components 500, 504, 506, 510, 520, 535, 550, 560 may be configured to implement part or all of the features described herein.

In some embodiments, electronic device 500C may include or be in communication with one or more external cameras. For example, electronic device 500C may include (or be in communication with) one or more cameras (or an array of cameras) that may be configured to capture images of a physical location of a user.

In addition, as described herein, processor 502 may include one or more processing elements. Thus, processor 502 may include one or more integrated circuits (ICs) that are configured to perform the functions of processor 502. In addition, each integrated circuit may include circuitry (e.g., first circuitry, second circuitry, etc.) configured to perform the functions of processor(s) 502.

Figure 4A:
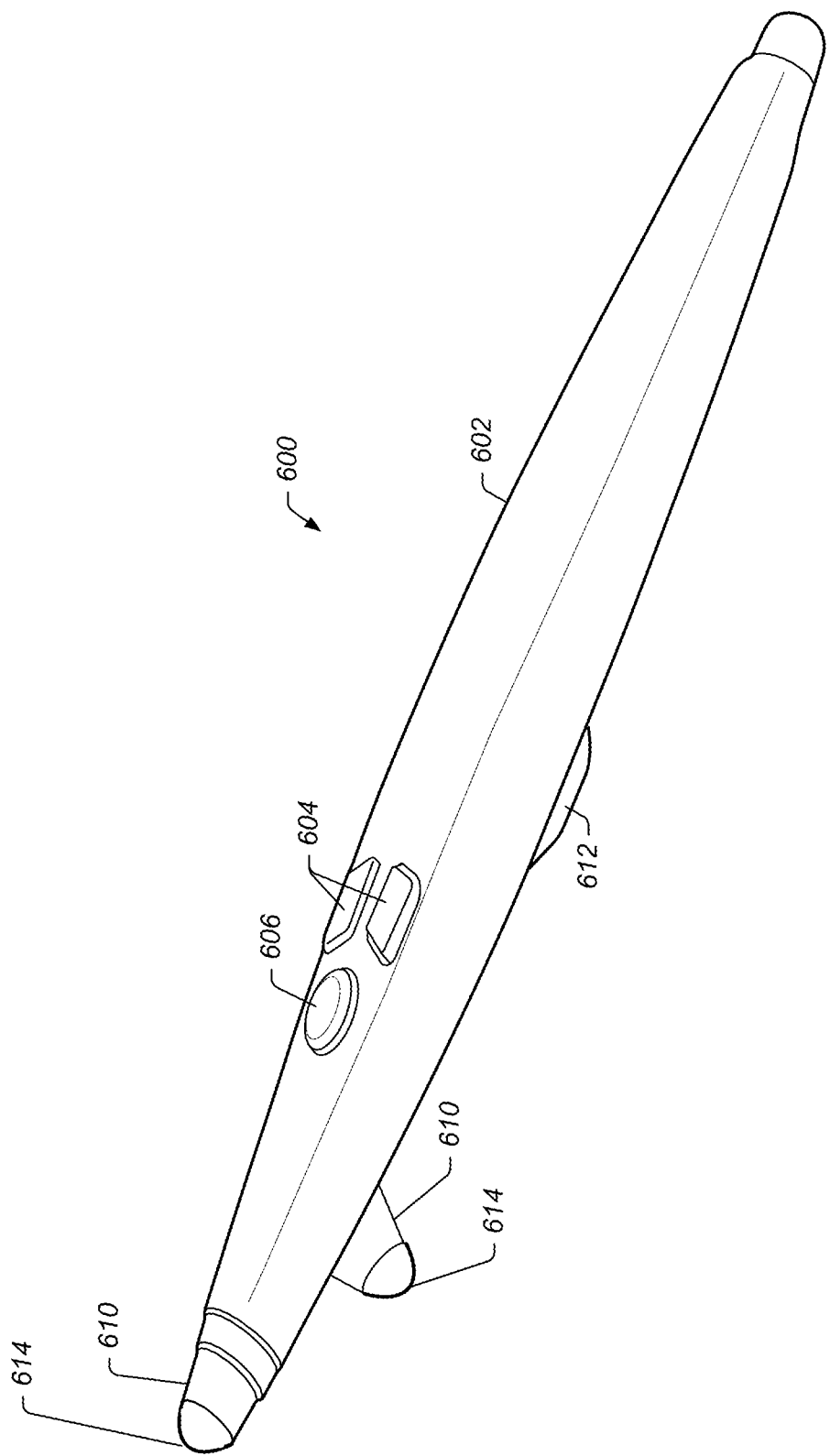
FIGS. 4A and 4B illustrate examples of a user input device, according to some embodiments.
Figure 4B:
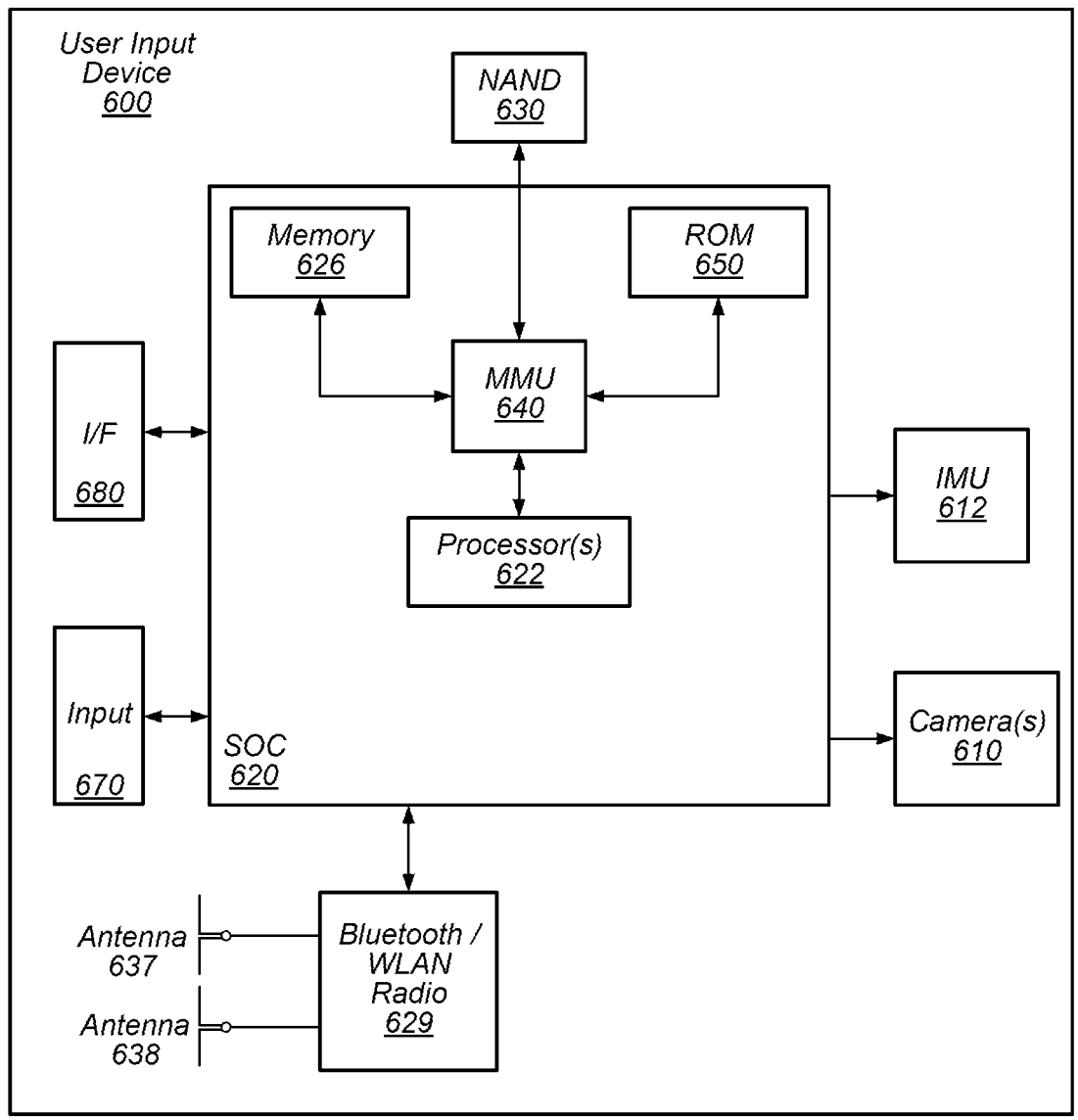

FIGS. 4A and 4B illustrate examples of a user input device, according to some embodiments. As shown in FIG. 4A, a user input device 600 may be configured to perform various embodiments as described herein. User input device 600 may be similar to or the same as user input device 130 as described above in reference to FIGS. 2 and 3B-3C. Thus, user input device 600 may be used in conjunction with, or be included in, systems 100A-B and/or systems 500A-B. As described above, systems 100A-B and/or systems 500A-B may have the capability to determine the six-axis position and orientation (e.g., pose) of user input device 600. Note that this includes the X, Y, Z location of a tip of user input device 600 and the a, B, y angular orientation of body 602 of user input device 600. However, it should be further noted that user input device 600 is exemplary, and that other user input devices, suitably configured, may be used as desired.

As shown, user input device 600 may include buttons 604, 606, and 612. In some instances, the buttons 604, 606, and/or 612 may be faux (or dummy) buttons. In other words, buttons 604, 606, and/or 612 may be non-functioning buttons, e.g., a system, such as systems 100A-B and/or 500A-B described herein, may detect a user action of pressing a location of user input device 600 identified by the system as a button location. Hence, in some instances, buttons 604, 606, and/or 612 may be identifiable locations (e.g., via a visible marker, a raised area, and/or a dimpled or depressed area). In some instances, one of the buttons, such as button 606, may be "depressed" and "held down" to trigger the selection of an object within a 3D scene presented by any of systems 100A-B and/or 500A-B. Additionally, system 100 may be configured to display a virtual "laser like" projection from a tip to the selected object. With the object selected, adjustment of the position and/or orientation of user input device 600 may change the position and/or orientation of the object. Thus, movements of the user input device 600 may result in corresponding translations and/or rotations of the object.

FIG. 4B illustrates an example simplified block diagram of a user input device 600. According to embodiments, user input device 600 may be an active stylus. As noted above, user input device 600 may be used in conjunction with the systems described above in reference to FIGS. 1A and 1B and FIGS. 3B and 3C. For example, user input device 600 may be configured as an input device to any of the described systems. In some embodiments, user input device 600 may be configured to communicate with a 3D system either wirelessly (e.g., via a local area network such as a Wi-Fi, Bluetooth, or Bluetooth low energy connection) or via a wired interface such as a universal serial bus interface, among other wired interfaces.

As shown, the user input device 600 may include a system on chip (SOC) 600, which may include portions for various purposes. The SOC 600 may be coupled to various other circuits of the user input device 600. For example, the user input device 600 may include various types of memory (e.g., including NAND flash 630), a connector interface (I/F) (or dock) 680 (e.g., for coupling to a computer system, dock, charging station, etc.), input(s) 670 (e.g., such as buttons 604, 606, and 612), and short to medium range wireless communication circuitry 629 (e.g., Bluetooth™ and WLAN circuitry). The short to medium range wireless communication circuitry 629 may also couple to one or more antennas, such as antennas 637 and 638 as shown. The short to medium range wireless communication circuitry 629 may include multiple receive chains and/or multiple transmit chains for receiving and/or transmitting multiple spatial streams, such as in a multiple-input multiple output (MIMO) configuration.

As shown, the SOC 600 may include processor(s) 622, which may execute program instructions for the user input device 600. The processor(s) 602 may also be coupled to memory management unit (MMU) 640, which may be configured to receive addresses from the processor(s) 622 and translate those addresses to locations in memory (e.g., memory 626, read only memory (ROM) 650, NAND flash memory 630) and/or to other circuits or devices, such as, short range wireless communication circuitry 629, connector interface (I/F) 680, input(s) 670, IMU(s) 612, and/or camera(s) 610. The MMU 640 may be configured to perform memory protection and page table translation or set up. In some embodiments, the MMU 640 may be included as a portion of the processor(s) 622.

As described herein, the user input device 600 may include hardware and software components for implementing the features described herein, e.g., the user input device 600 may form at least part of a 3D display system such as systems 100A, 100B, 500A, and/or 500B as described herein. For example, the processor 622 of the user input device 600 may be configured to implement part or all of the features described herein, e.g., by executing program instructions stored on a memory medium (e.g., a non-transitory computer-readable memory medium). Alternatively (or in addition), processor 622 may be configured as a programmable hardware element, such as an FPGA (Field Programmable Gate Array), or as an ASIC (Application Specific Integrated Circuit). Alternatively (or in addition) the processor 622 of the user input device 600, in conjunction with one or more of the other components 620, 640, 650, 626, 630, 612, 610, 629, 637, 638, 670, 680, and/or 680 may be configured to implement part or all of the features described herein.

In addition, as described herein, processor 622 may include one or more processing elements. Thus, processor 622 may include one or more integrated circuits (ICs) that are configured to perform the functions of processor 622. In addition, each integrated circuit may include circuitry (e.g., first circuitry, second circuitry, etc.) configured to perform the functions of processor(s) 622.

In some instances, user input device 600 may include one or more cameras, such as camera 610 with corresponding lens 614. The one or more cameras 610 may be wide-angle video cameras, at least in some instances. In some instances, the one or more cameras may be monochromatic and/or color cameras. As shown, a first camera of the one or more cameras 610 may be located at the tip of the user input device 600. Thus, the first camera may capture images (e.g., video and or a sequence of images) in a direction that the stylus is pointing, e.g., such as at a display screen of systems 100A-B. In some instances, a wide-angle camera may be used in an effort to capture at least three corners of the display screen, thereby aiding in orienting (e.g., in 3D space) the user input device 600 relative to the display. In other words, the first camera may aid in determining a pose of the user input device 600. In some instances, the lens 614 may be a prism or other optic that may allow two simultaneous views from the first camera. For example, the view from the first camera may be split between a first view directed in the direction of the tip of the user input device 600 and a second view directed down from the direction of the tip of the user input device. In this manner, the first camera may have a first view corresponding to a view of a display and a second view corresponding to a view of a keyboard.

In some instances, the user input device 600 may include a second camera 610 (e.g., a second camera of the one or more cameras). The second camera may be oriented in a down-ward facing direction, e.g., to capture images (e.g., sequences of images and/or video) of a keyboard of systems 100A-B. Such a scheme may allow for tracking of the user input device 600 when the first camera is not directed towards the display.

In some instances, the user input device 600 may include one or more inertial measurement units (IMUs), such as IMU 612. Each IMU may include a gyroscope, a compass, and/or an accelerometer. Each IMU may provide information associated with motion of the user input device 600 in 3D space and may aid in determination of changes in position and/or orientation of the user input device 600.

As noted above, the user input device 600 may include one or more processors 622. The one or more processors 622 may be in communication with the one or more cameras and the one or more IMUs. The one or more processors 622 may be configured to determine a position and/or orientation (e.g., pose) of the user input device 600 in 3D space, e.g., relative to a display and/or relative to a 3D display system. For example, the user input device 600 may determine, e.g., based on embodiments as further described herein, its pose in 3D space and transmit the pose (e.g., continuously and/or in real-time) to a 3D display system via a wired or unwired (e.g., via Bluetooth, Wi-Fi, and/or an other wireless communication standard) connection. Thus, the user input device 600 may further include a communication interface, e.g., such as a wireless interface comprising at least one radio and one or more antennas.

In some instances, the one or more processors 622 may be configured to capture images. e.g., digital photographs and/or videos, via the one or more cameras 610. These images could be sent to a display for viewing and/or to a printer. In addition, the one or more processors may be configured to operate as a document scanner, a 3D scanner for virtual 3D re-construction of real-world objects, a barcode scanner, a quick response (QR) code scanner, a digital (or virtual) writing tool, a digital (or virtual) painting tool, and so forth.

Pose Determination of a User Input Device

In the current art of three-dimensional (3D) augmented or virtual reality (AR/VR) interactive scenes, a six-degree of freedom (6DoF) position and orientation (e.g., pose) of a user input device may be determined/tracked via external cameras of a 3D display system. The pose may be transformed into a display coordinate system located at a center of a display panel.

In general, pose estimation may be considered as a process of determining a 3D position and orientation (roll, pitch, yaw) of an object in a wide range of applications (e.g., robotics, autonomous driving, virtual reality, human-computer interaction). There have been many approaches developed using various hardware from one or more passive color and/or grayscale cameras to combinations of cameras with active laser or light emitting diode (LED) pattern generators.

Currently, methods for 6DoF pose estimation may rely on hand-crafted features and classical computer vision algorithms, which may not be effective in complex virtual/augmented reality scenes with partial occlusions, cluttered backgrounds, varying illumination, and object contrast. However, a deep learning-based approach may address these limitations by learning to extract relevant features directly from input data. For example, neural networks with deep learning techniques for estimating camera pose are considered as the state of the art. However, performance with respect to pose estimation accuracy and computing resources is unknown.

Therefore, improvements in pose tracking are desired.

Embodiments described herein provide systems, methods, and mechanisms six-degree of freedom (6-DoF) pose estimation of a user input device, e.g., in a three-dimensional (3D) display system rendering interactive augmented reality (AR) and/or virtual reality (VR) experiences, e.g., to overcome current technical design and execution challenges as described above. Embodiments described herein may include methods performed by a client device, e.g., a user equipment device (UE) to estimate a 6-DoF pose of a user input device that employ the usage of a neural network model for 6-DoF pose estimation of the user input device, a dataset-based model for 6-DoF pose estimation of the user input device, a Charuco codes-based model for 6-DoF pose estimation of the user input device, and/or some combination thereof. In addition, embodiments described herein may include methods performed by a user input device, e.g., such as an active stylus, to estimate a 6-DoF pose of a user input device that employ the usage of a neural network model for 6-DoF pose estimation of the user input device, a dataset-based model (e.g., which rely on a large collection of images of an object taken from many angles which then serve as a template for matching a live stream of images to) for 6-DoF pose estimation of the user input device, a feature-set based model (e.g., which rely on tracking features through time and exploiting geometric properties that exist between 3D and 2D projections) for 6-DoF pose estimation of the user input device, and/or some combination thereof.

Figure 5:
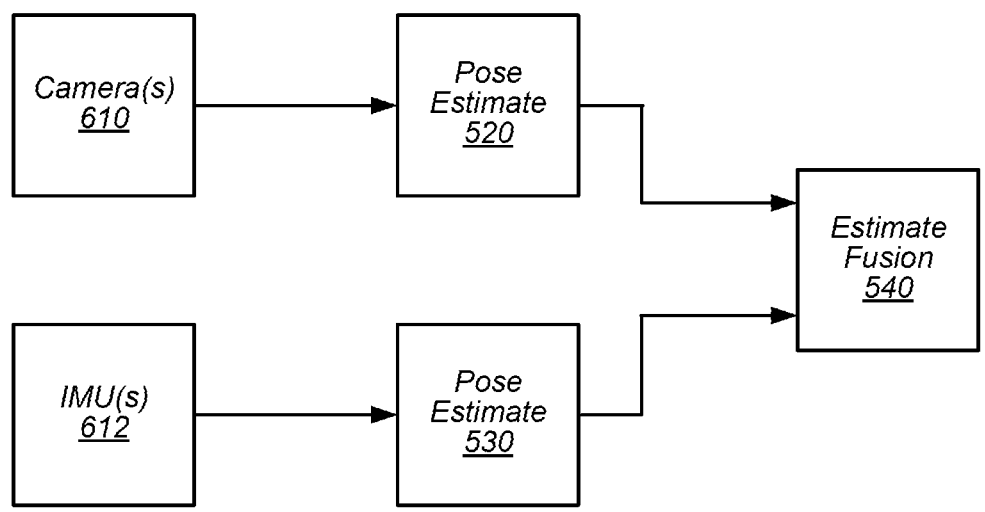
FIG. 5 illustrates an example of pose estimation fusion, according to some embodiments.

In some instances, e.g., as illustrated by FIG. 5, a data stream from an IMU, e.g., from an IMU of a user input device 600, and images from a camera, e.g., from a camera of the user input device 600, may be used as an input to a neural network. As shown in FIG. 5, camera(s) 610 of the user input device 600 may be used to generate a pose estimate 520 (e.g., a 6 DOF pose estimate). Similarly, IMU(s) 612 of the user input device may be used to generate a pose estimate 530 (e.g., a 6 DOF pose estimate). The pose estimates 520 and 530 may then be fused into a single pose estimation (e.g., Estimate Fusion 540). For example, the neural network may use the data stream and images to determine a pose estimate for the user input device 600, e.g., relative to a display of a 3D display system and/or a display of a head-mounted AR/VR system. In some instances, the neural network-based pose estimate may only use the data stream from the IMU when the camera is too close to the display and/or images contain too much motion blur. In some instances, the neural network may additionally incorporate and/or use images from a second camera of the user input device 600 to determine the pose estimate. Note that in general, techniques for pose estimation based on neural networks may include two stages: (1) training and (2) inference. During the training stage, a model may be trained on a large dataset of red-green-blue (RGB) images and corresponding ground-truth poses. Many models may include a convolutional neural network (CNN) that extracts features from the input images, followed by a fully connected layer that may estimate pose parameters. During the inference stage, the model may be applied to a separate set of RGB images to estimate poses and the resulting accuracy on this set may be used as feedback to tune neural network weights.

Figure 6A:
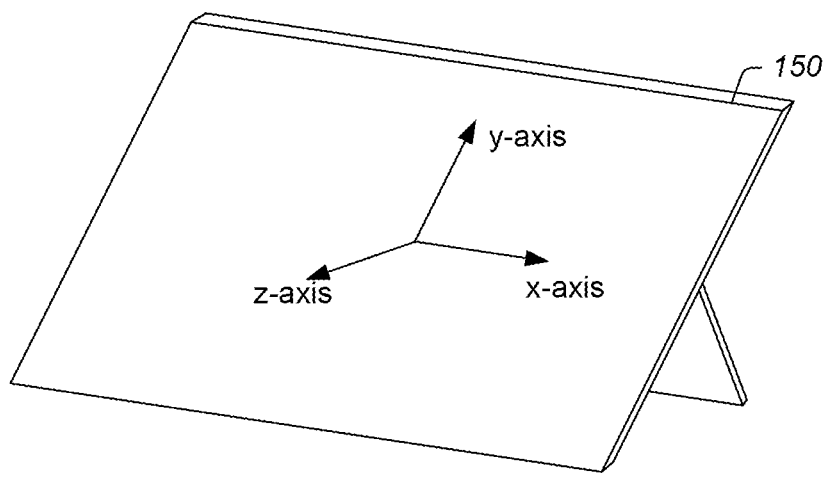
FIGS. 6A, 6B, and 6C illustrate examples of local coordinate systems considered during pose estimation, according to some embodiments.
Figure 6B:
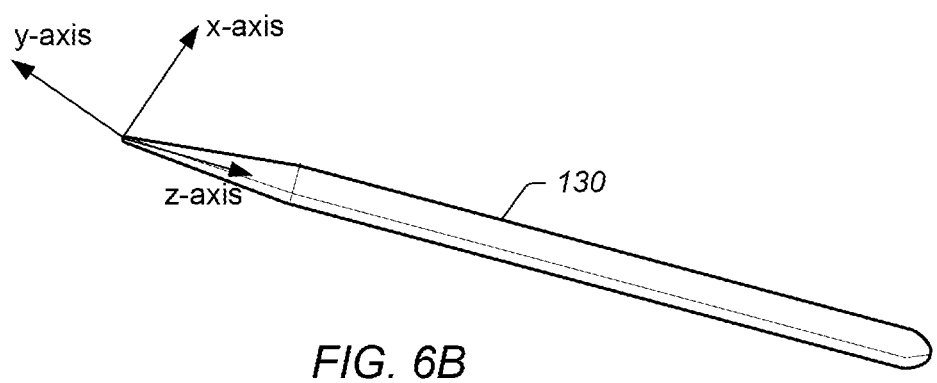
Figure 6C:
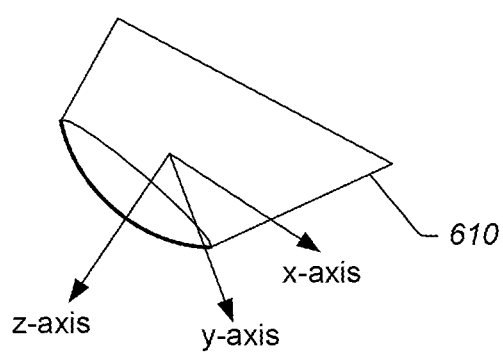

Note that a user input device, such as user input device 600, may be considered as a tool that may allow a user to interrogate a three-dimensional space which is rendered on a display. Rendering media may display a scene with respect to its world coordinate system which has an origin and three orthogonal basis vectors generally referred to as X, Y and Z (e.g., as illustrated by FIG. 6A). Any interaction with the scene must be reported within this world coordinate system, The user input device may have its own local 3 axis coordinate system (e.g., as illustrated by FIG. 6B) which may be transformed into the world space. As shown in FIG. 6A, the world coordinate system may be positioned at a center of a display with an x and y axes plane parallel to the screen surface which leaves the z axis normal to the surface. As shown in FIG. 6B, the user input device coordinate system may originate at its tip and has the z axis directed along the length of the user input device. Additionally, a camera system may include a lens which focuses light onto a photo-sensitive device such as a CCD or CMOS chip. The camera system position and orientation may be described by its own three-dimensional coordinate system located at the lens focal point with the z axis perpendicular to the front lens element, e.g., as shown in FIG. 6C. Note that by including a camera on the end user device, the camera's local coordinate system may be used to describe the 6DOF pose of the user input device. An IMU, e.g., IMUs 612, with its own coordinate system may also be incorporated into the end user device. The camera video stream may include views of the display and its surrounding environment whose geometry can be exploited for estimating the 6 DOF camera pose, at least in some instances.

In some instances, a dataset of RGB images may include a diverse range of camera poses, backgrounds, and/or lighting conditions, e.g., to ensure model robustness and generalizability. For example, a scene that contains a laptop and/or display where lighting and surfaces are controllable may be simulated and the scene may be projected through a lens and onto a 2D image. The model may then be evaluated on a held-out test set and its performance may be measured using standard metrics such as mean average precision (mAP) and/or mean error (mE).

In some instances, a set of unique and identifiable patterns (e.g., Charuco codes) may be deployed in applications such as camera calibration and object tracking where detection of a 6-DoF pose is required. For example, using a camera, e.g., such as a camera of a user input device, to collect video while displaying the set of unique and identifiable patterns on the screen may allow the 6-DoF pose of the screen to be found. In addition, normally white portions of set of unique and identifiable patterns may be colored green, e.g., to allow detection and removal of the pattern from the video. In some instances, to avoid biasing any detection algorithms, an alternative image can be pasted in place of the set of unique and identifiable patterns (e.g., Charuco patterns). Therefore, the data can be used to train an algorithm without it locking on and being biased by the set of unique and identifiable patterns. Note that using the data for algorithm evaluation may also require the set of unique and identifiable patterns be removed in order to eliminate any bias.

Figure 7:
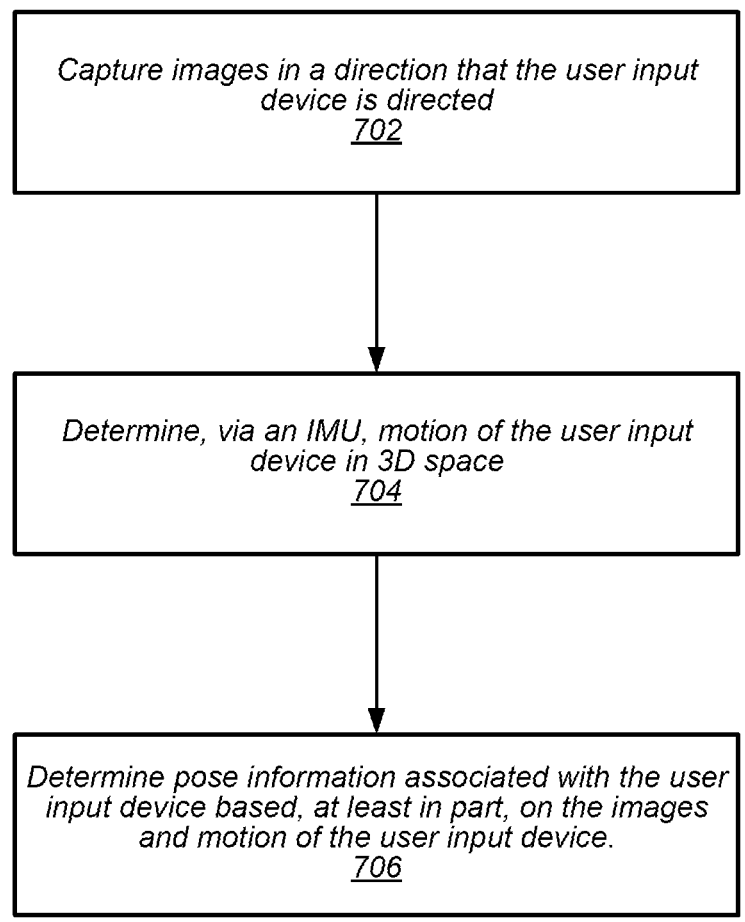
FIGS. 7 and 8 illustrate block diagrams of examples of methods for determining a pose of a user input device, according to some embodiments.

FIG. 7 illustrates a block diagram of an example of a method for determining a pose of a user input device, according to some embodiments. The method shown in FIG. 7 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 702, a user input device, such as user input device 600, may capture, e.g., via at least one camera of the user input device, images in a direction that the user input device is directed. The images may be a sequence of images and/or a video stream of images. The at least one camera may be disposed at a forward-facing tip of the user input device, at least in some instances. The at least one camera may be a wide-angle camera. In some instances, the at least one camera may be a monochromatic camera and/or a color camera (e.g., an RGB camera).

In some instances, the at least one camera may include a lens configured to split a view of the at least one camera between the direction that user input device is directed and a second direction. In some instances, in a main orientation of the user input device (e.g., such as when the tip of the user input device is directed forward), the second direction may be downward-facing with respect to the main orientation of the user input device. Further, to capture images in the direction that the user input device is directed, the user input device may capture images in the second direction, e.g., via the lens. In some instances, the direction may correspond to a view of a display of a computer system and the second direction may correspond to a view of a keyboard of the computer system.

In some instances, the at least one camera may include a second camera. In other words, the at least one camera may be considered a first camera of the user input device and the user input device may include the second camera. The second camera may be disposed on a bottom of the user input device. In such instances, to capture the images, the user input device may capture images via both first camera (e.g., the at least one camera) and the second camera.

At 704, the user input device may determine, via an inertial measurement unit (IMU), motion of the user input device in three-dimensional (3D) space. In some instances, the IMU may include a gyroscope, a compass, and/or an accelerometer.

At 706, the user input device may determine pose information associated with the user input device based, at least in part, on the images and motion of the user input device. The pose information may include a six-degree of freedom position and orientation of the user input device. In some instances, the pose information may be determined relative to a display of a computer system. The computer system may be a three-dimensional (3D) computer system. In some instances, the pose information may be determined relative to a display of a head-mounted virtual reality/augmented reality system.

In some instances, to determine pose information associated with the user input device, the user input device may provide the images and motion of the user input device as inputs to neural network model and receive, from the neural network model, an estimate of a pose of the user input device, wherein the pose information comprises the estimate of the pose of the user input device. In such instances, the at least one camera may be a color camera. The neural network model may be a convolutional neural network.

In some instances, to determine pose information associated with the user input device, the user input device may provide the images and motion of the user input device as inputs to an estimation model trained on a set of unique and identifiable patterns and receive, from the estimation model, an estimate of a pose of the user input device, wherein the pose information comprises the estimate of the pose of the user input device. The set of unique and identifiable patterns may be Charuco codes.

In some instances, to determine pose information associated with the user input device, the user input device may provide the images and motion of the user input device as inputs to an estimation model trained on a dataset of images and receive, from the estimation model, an estimate of a pose of the user input device, wherein the pose information comprises the estimate of the pose of the user input device. The images may be red-green-blue (RGB) images (e.g., color images). In some instances, performance of the estimation model is evaluated based on mean average precision and/or mean error.

In some instances, the user input device may send, to a computer system, e.g., such as 3D display systems 100A, 100B, 500A, and/or 500B, the pose information, e.g., via a wired and/or wireless connection. In instances, when the user input device supports a wireless connection to the computer system, the user input device may include at least one antenna and at least one radio in communication with the at least one antenna. The at least one radio may be configured to operate according to at least one short-range radio access technology (RAT), e.g., such as one or more of Bluetooth, Bluetooth Low Energy, Wi-Fi, and/or Near Field Communication (NCF).

In some instances, the user input device may be configured to operate as one or more of an active stylus, two-dimensional (2D) scanner, a three-dimensional (3D) scanner, a barcode scanner, a quick response (QR) code scanner, a digital writing tool, a digital painting tool, or a digital camera. In such instances, the user input device may receive a first user input and select a mode of operation based on the first user input. The mode of operation may include one or more of active stylus, digital camera, 2D scanner, 3D scanner, barcode scanner, QR code scanner, digital writing tool, and/or digital painting tool. The first user input may be received via one or more buttons of the user input device and/or via an indication received from a companion device. The companion device may include at least one of a 3D display system, a UE, a head-mounted VR/AR system, and/or a computer system.

Figure 8:
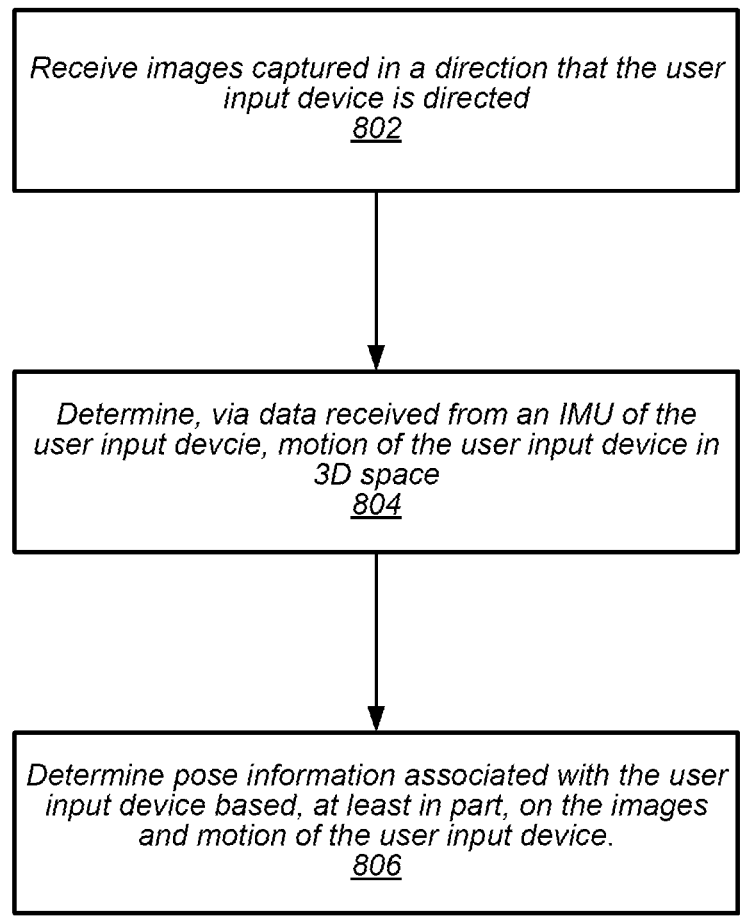

FIG. 8 illustrates a block diagram of an example of another method for determining a pose of a user input device, according to some embodiments. The method shown in FIG. 8 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 802, a computer system, e.g., such as 3D display systems 100A, 100B, 500A, and/or 500B, may receive, from a user input device, such as user input device 600, images in a direction that the user input device is directed. The images may be captured via at least one camera disposed at a forward-facing tip of the user input device. The images may be a sequence of images and/or a video stream of images. The at least one camera may be a wide-angle camera. In some instances, the at least one camera may be a monochromatic camera and/or a color camera (e.g., an RGB camera). The user input device may be an active stylus.

In some instances, the at least one camera may include a lens configured to split a view of the at least one camera between the direction that user input device is directed and a second direction. In some instances, in a main orientation of the user input device (e.g., such as when the tip of the user input device is directed forward), the second direction may be downward-facing with respect to the main orientation of the user input device. Further, the captures images in the direction that the user input device is directed may include captured images in the second direction, e.g., via the lens. In some instances, the direction may correspond to a view of a display of a computer system and the second direction may correspond to a view of a keyboard of the computer system.

In some instances, the at least one camera may include a second camera. In other words, the at least one camera may be considered a first camera of the user input device and the user input device may include the second camera. The second camera may be disposed on a bottom of the user input device. In such instances, the captured images may include captured images from both first camera (e.g., the at least one camera) and the second camera.

In some instances, the images may be received via a wired and/or wireless connection. The wireless connection may be at least one of Bluetooth, Bluetooth Low Energy, Wi-Fi, and/or Near Field Communication (NCF).

At 804, the computer system may determine, from data received from an inertial measurement unit (IMU) of the user input device, motion of the user input device in three-dimensional (3D) space. In some instances, the IMU may include a gyroscope, a compass, and/or an accelerometer.

At 806, the computer system may determine pose information associated with the user input device based, at least in part, on the images and motion of the user input device. The pose information may include a six-degree of freedom position and orientation of the user input device. In some instances, the pose information may be determined relative to a display of the computer system. The computer system may be a three-dimensional (3D) computer system. In some instances, the pose information may be determined relative to a display of a head-mounted virtual reality/augmented reality system, e.g., the computer system may be a head-mounted virtual reality/augmented reality system.

In some instances, to determine pose information associated with the user input device, the computer system may provide the images and motion of the user input device as inputs to neural network model and receive, from the neural network model, an estimate of a pose of the user input device, wherein the pose information comprises the estimate of the pose of the user input device. In such instances, the at least one camera may be a color camera. The neural network model may be a convolutional neural network.

In some instances, to determine pose information associated with the user input device, the computer system may provide the images and motion of the user input device as inputs to an estimation model trained on a set of unique and identifiable patterns and receive, from the estimation model, an estimate of a pose of the user input device, wherein the pose information comprises the estimate of the pose of the user input device. The set of unique and identifiable patterns may be Charuco codes.

In some instances, to determine pose information associated with the user input device, the computer system may provide the images and motion of the user input device as inputs to an estimation model trained on a dataset of images and receive, from the estimation model, an estimate of a pose of the user input device, wherein the pose information comprises the estimate of the pose of the user input device. The images may be red-green-blue (RGB) images (e.g., color images). In some instances, performance of the estimation model is evaluated based on mean average precision and/or mean error.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for determining a pose of an active stylus, comprising:
a computer system,
receiving, from the active stylus comprising at least one camera disposed at a forward-facing tip of the active stylus, images in a direction that the active stylus is directed, wherein the at least one camera further comprises a lens configured to split a view of the at least one camera between the direction that the active stylus is directed and a second direction;
determining, from data received from an inertial measurement unit (IMU) of the active stylus, motion of the active stylus in three-dimensional (3D) space; and
determining pose information associated with the active stylus based, at least in part, on the images received from the active stylus and the motion of the active stylus as determined from the data received from the IMU of the active stylus.

2. The method of claim 1,
wherein the at least one camera comprises a wide-angle camera.

3. The method of claim 1,
wherein the at least one camera is a monochromatic camera or a color camera.

4. The method of claim 1,
wherein, in a main orientation of the active stylus, the second direction is downward-facing with respect to the main orientation of the active stylus.

5. The method of claim 1,
wherein receiving images in the direction that the active stylus is directed further comprises receiving images in the second direction.

6. The method of claim 1,
wherein the direction corresponds to a view of a display of the computer system, and wherein the second direction corresponds to a view of a keyboard of the computer system.

7. The method of claim 1,
wherein the images comprise a sequence of images.

8. The method of claim 1,
wherein determining, from data received from the IMU of the active stylus, motion of the active stylus in 3D space includes providing the images and motion of the active stylus as inputs to an estimation model and receiving, from the estimation model, an estimate of a pose of the active stylus.

9. The method of claim 1,
wherein the images in the direction that the active stylus is directed are received via a wireless connection with the active stylus.

10. A computer system, comprising:
a memory; and
at least one antenna;
at least one radio in communication with the at least one antenna; and
at least one processor in communication with the memory and the at least one radio and configured to:
receive, from a user input device comprising at least one camera disposed at a forward-facing tip of the user input device, images in a direction that the user input device is directed via a wireless connection with the user input device;
determine, from data received from an inertial measurement unit (IMU) of the user input device, motion of the user input device in three-dimensional (3D) space; and
determine pose information associated with the user input device based, at least in part, on the images and motion of the user input device.

11. The computer system of claim 10,
wherein the wireless connection operates according to at least one short-range radio access technology (RAT).

12. The computer system of claim 11,
wherein the at least one RAT comprises at least one of Bluetooth, Wi-Fi, or Near Field Communication (NCF).

13. The computer system of claim 10,
wherein the pose information comprises a six-degree of freedom position and orientation of the user input device.

14. The computer system of claim 10,
wherein the pose information is determined relative to a display of the computer system.

15. The computer system of claim 14,
wherein the computer system comprises a three-dimensional (3D) computer system.

16. The computer system of claim 10,
wherein the pose information is determined relative to a display of a head-mounted virtual reality/augmented reality system.

17. The computer system of claim 10,
wherein the user input device comprises an active stylus.

18. The computer system of claim 10,
wherein the computer system comprises a user equipment device (UE) or a head-mounted three-dimensional display system.

19. The computer system of claim 10,
wherein, to determine, from data received from the IMU of the user input device, motion of the user input device in three-dimensional 3D space includes the at least one processor providing the images and motion of the user input device as inputs to an estimation model and receiving, from the estimation model, an estimate of a pose of the user input device.

20. A non-transitory computer readable memory medium storing programming instructions executable by processing circuitry of a computer system to:
receive, from a user input device comprising at least one camera disposed at a forward-facing tip of the user input device, images in a direction that the user input device is directed;
determine, from data received from an inertial measurement unit (IMU) of the user input device, motion of the user input device in three-dimensional (3D) space, including providing the images and motion of the user input device as inputs to an estimation model and receiving, from the estimation model, an estimate of a pose of the user input device; and
determine pose information associated with the user input device based, at least in part, on the images and motion of the user input device.

21. The non-transitory computer readable memory medium of claim 20,
wherein, to determine pose information associated with the user input device based, at least in part, on the images and motion of the user input device, the programming instructions are further executable by the processing circuitry to:
provide the images and motion of the user input device as inputs to a neural network model; and
receive, from the neural network model, an estimate of a pose of the user input device, wherein the pose information comprises the estimate of the pose of the user input device.

22. The non-transitory computer readable memory medium of claim 21,
wherein the at least one camera comprise a color camera.

23. The non-transitory computer readable memory medium of claim 21,
wherein the neural network model comprises a convolutional neural network.

24. The non-transitory computer readable memory medium of claim 20,
wherein the estimation model is trained on a set of unique and identifiable patterns.

25. The non-transitory computer readable memory medium of claim 24, wherein the set of unique and identifiable patterns comprise Charuco codes.

26. The non-transitory computer readable memory medium of claim 20,
wherein the estimation model is trained on a dataset of images.

27. The non-transitory computer readable memory medium of claim 26,
wherein the pose information comprises the estimate of the pose of the user input device.

28. The non-transitory computer readable memory medium of claim 26,
wherein the images comprise red-green-blue (RGB) images.

29. The non-transitory computer readable memory medium of claim 26,
wherein performance of the estimation model is evaluated based on mean average precision or mean error.

30. The computer system of claim 19,
wherein the estimation model is trained on at least one of:
 a set of unique and identifiable patterns; or
 a dataset of images.

\* \* \* \* \*